(12) United States Patent
Lee et al.

(10) Patent No.: US 11,036,321 B2
(45) Date of Patent: Jun. 15, 2021

(54) LIGHT CONTROL FILM AND DISPLAY APPARATUS INCLUDING THE SAME

(71) Applicant: LG DISPLAY CO., LTD., Seoul (KR)

(72) Inventors: SeMin Lee, Paju-si (KR); JaeJin Kim, Paju-si (KR); JaeJung Han, Paju-si (KR); JinRyun Kim, Paju-si (KR); DaeYong Kim, Paju-si (KR); YongJoong Yoon, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/523,427

(22) Filed: Jul. 26, 2019

(65) Prior Publication Data

US 2020/0033980 A1 Jan. 30, 2020

(30) Foreign Application Priority Data

Jul. 27, 2018 (KR) .................. 10-2018-0087882
Dec. 27, 2018 (KR) .................. 10-2018-0170611

(51) Int. Cl.
*G06F 3/041* (2006.01)
*G02F 1/1337* (2006.01)
*G02B 5/30* (2006.01)
*G02B 5/02* (2006.01)
*G02B 5/00* (2006.01)

(52) U.S. Cl.
CPC ...... *G06F 3/0412* (2013.01); *G02F 1/133707* (2013.01); *G02B 5/003* (2013.01); *G02B 5/0278* (2013.01); *G02B 5/3033* (2013.01)

(58) Field of Classification Search
CPC ...... G06F 3/041; G06F 3/0412; G02F 1/1335; G02F 1/133504; G02F 1/133524; G02F 1/133555; G02F 1/133602; G02F 1/133603; G02F 1/1337; G02F 1/133707; G02B 5/003; G02B 5/0215; G02B 5/0278; G02B 5/3033; G02B 6/0053; G02B 2207/123; G03B 21/60; B32B 37/12

See application file for complete search history.

(56) References Cited

U.S. PATENT DOCUMENTS 5,839,823 A * 11/1998 Hou .................. G02F 1/133605
362/327
7,374,328 B2 5/2008 Kuroda et al.
(Continued)

FOREIGN PATENT DOCUMENTS

CN 10131098 A 11/2008
JP 2002-174859 A 6/2002
(Continued)

OTHER PUBLICATIONS

China Office Action for a Application No. 201910689814.3 dated Nov. 23, 2020.

*Primary Examiner* — Joe H Cheng
(74) *Attorney, Agent, or Firm* — Birch, Stewart, Kolasch & Birch, LLP

(57) ABSTRACT

A light control film can include a lens part including a plurality of optical patterns; a viewing angle controller including a plurality of slits; and a first based film disposed between the lens part and the viewing angle controller, in which the viewing angle controller has a light transmitting part and a light absorbing part which are alternately disposed, the light absorbing part being disposed in each of the plurality of slits.

32 Claims, 29 Drawing Sheets

(56) References Cited

U.S. PATENT DOCUMENTS

| | | | |
|---|---|---|---|
| 8,212,976 B2* | 7/2012 | Park | G02F 1/13394 349/106 |
| 8,408,775 B1* | 4/2013 | Coleman | F21V 7/04 362/615 |
| 2009/0079896 A1* | 3/2009 | Hayashi | G02F 1/1303 349/58 |
| 2009/0079900 A1* | 3/2009 | Ohta | G02F 1/133602 349/58 |
| 2009/0165943 A1 | 7/2009 | Kim | |
| 2011/0026240 A1* | 2/2011 | Hayashi | G02F 1/133615 362/97.1 |
| 2013/0320333 A1* | 12/2013 | Koyama | G02F 1/13338 257/43 |
| 2014/0022479 A1* | 1/2014 | Hosaka | H01L 27/1248 349/43 |
| 2015/0187800 A1* | 7/2015 | Park | H01L 29/7869 349/43 |
| 2016/0018635 A1* | 1/2016 | Adachi | G02B 26/02 359/228 |
| 2018/0120580 A1* | 5/2018 | Ouderkirk | H01L 31/054 |
| 2020/0033689 A1* | 1/2020 | Lee | G02F 1/1676 |

FOREIGN PATENT DOCUMENTS

| | | | |
|---|---|---|---|
| JP | 2018-60129 A | | 4/2018 |
| JP | 2018060129 A | * | 4/2018 |
| KR | 10-0605617 B1 | | 8/2006 |
| KR | 10-2007-0090654 A | | 9/2007 |
| KR | 10-1022597 B1 | | 3/2011 |
| KR | 10-2014-0071111 A | | 6/2014 |
| KR | 10-1481823 B1 | | 1/2015 |
| KR | 10-2018-0012176 A | | 2/2018 |

* cited by examiner

LIGHT CONTROL FILM AND DISPLAY APPARATUS INCLUDING THE SAME

CROSS-REFERENCE TO RELATED APPLICATIONS

This application claims the priority benefit of Korean Patent Application Nos. 10-2018-0087882 filed in the Republic of Korean on Jul. 27, 2018, and 10-2018-0170611 filed in the Republic of Korean on Dec. 27, 2018, all of these applications are incorporated herein by reference.

BACKGROUND

Field of the Invention

The present disclosure relates to a light control film and a display apparatus including the same.

Discussion of the Related Art

Display apparatuses, such as liquid crystal display (LCD) apparatuses and electroluminescent display apparatuses, are easy to realize a high resolution and have various advantages of large-screen display apparatuses.

The display apparatuses each include a display panel for displaying an image. The display panel includes a plurality of pixels, and each of the plurality of pixels includes a plurality of subpixels for realizing individual colors. For example, each of the plurality of pixels may include a red subpixel, a green subpixel, and a blue subpixel.

However, a related art display apparatus has a problem where a difference occurs in the amount of light wavelength-based light emitted from a display panel with respect to a side viewing angle that causes a reduction in image quality. For example, in electroluminescent display apparatuses, an individual subpixel emits light of an individual color, but a difference occurs in the amount of light emitted by units of light wavelengths with respect to the side viewing angle in a situation where the light emitted from the individual subpixel is discharged to an upper surface of the display panel, causing a reduction in image quality. Particularly, the amount of emitted short-wavelength light such as blue light increases compared to long-wavelength light such as red light with respect to the side viewing angle, causing a problem where a wholly bluish image is displayed.

SUMMARY

Accordingly, the present disclosure is directed to providing a light control film and a display apparatus including the same that substantially obviates one or more problems due to limitations and disadvantages of the related art.

An aspect of the present disclosure is directed to providing a light control film which includes a lens part for improving an image with respect to a side viewing angle in a first direction and a viewing angle controller for blocking side light in a second direction vertical to the first direction, thereby solving a problem where a bluish image is displayed with respect to the side viewing angle.

Another aspect of the present disclosure is directed to providing a light control film which includes a lens part including a plurality of optical patterns arranged regularly or irregularly and a viewing angle controller including a plurality of slits which extend in a first direction and are spaced apart from one another in a second direction vertical to the first direction, thereby improving an image with respect to a side viewing angle, reinforcing security, and decreasing a phase-shown phenomenon.

Another aspect of the present disclosure is directed to providing a light control film which includes a lens part for improving an image with respect to a side viewing angle in a plurality of directions and a viewing angle controller for blocking side light in a second direction vertical to a first direction, thereby improving an image with respect to a side viewing angle in the plurality of directions and decreasing a phase-shown phenomenon.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a light control film including a first base film, a lens part on one surface of the first base film, the lens part including a plurality of optical patterns, and a viewing angle controller on the other surface of the first base film, the viewing angle controller including a plurality of slits.

In another aspect of the present disclosure, there is provided a light control film including a first base film, a lens part including a first lens layer disposed on one surface of the first base film and a second lens layer overlapping the first lens layer, the first lens layer including a first optical pattern and the second lens layer including a second optical pattern differing from the first optical pattern, and a viewing angle controller on the other surface of the first base film, the viewing angle controller including a plurality of slits.

In another aspect of the present disclosure, there is provided a display apparatus including a display panel, a polarizing film on the display panel, a touch panel on the polarizing film, and a light control film including a first base film, a lens part on one surface of the first base film, and a viewing angle controller on the other surface of the first base film, the lens part including a plurality of optical patterns and the viewing angle controller including a plurality of slits.

Details of other embodiments are included in the detailed description and the drawings.

It is to be understood that both the foregoing general description and the following detailed description of the present disclosure are examples and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Figure 1:
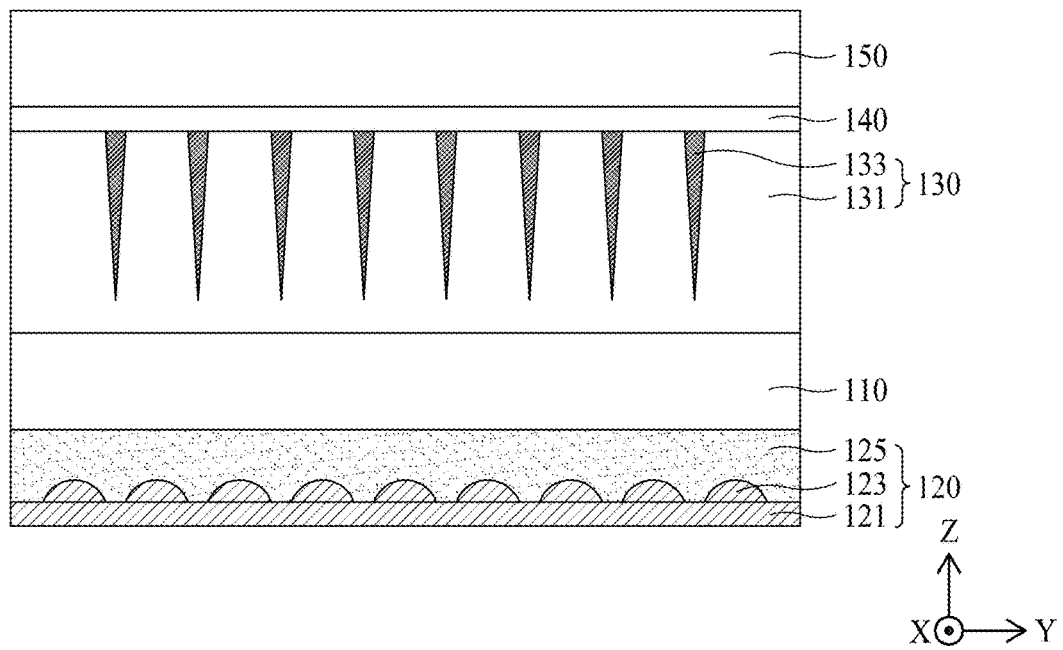
FIG. 1 is a cross-sectional view illustrating a light control film according to an embodiment of the present disclosure.

Reference will now be made in detail to the example embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a situation where "comprise," "have," and "include" described in the present specification are used, another part may be added unless "only" is used. The terms of a singular form may include plural forms unless referred to the contrary.

In construing an element, the element is construed as including an error range although there is no explicit description.

In describing a position relationship, for example, when a position relation between two parts is described as "on," "over," "under," and "next," one or more other parts may be disposed between the two parts unless 'just' or 'direct' is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," etc. may be used. The terms are merely for differentiating one element from another element, and the essence, sequence, order, or number of a corresponding element should not be limited by the terms. It will be understood that when an element or layer is described as being "connected," "coupled," or "adhered" to another element or layer, the element or layer can be directly connected or adhered to the other element or layer, but the other element or layer can be "disposed" between elements or layers, or elements or layers can be "connected," "coupled," or "adhered" to each other through the other element or layer.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings.

FIG. 1 is a cross-sectional view illustrating a light control film 100 according to a first embodiment of the present disclosure.

Referring to FIG. 1, the light control film 100 can include a first base film 110, a lens part 120, a viewing angle controller 130, an adhesive layer 140, and a protective film 150.

The first base film 110 can include one surface facing the lens part 120 and another surface facing the viewing angle controller 130. The one surface of the first base film 110 can support the lens part 120 in a process of forming the lens part 120, and the other surface of the first base film 110 can support the viewing angle controller 130 in a process of forming the viewing angle controller 130. For example, the first base film 110 can be formed of a transparent material, and an upper surface and a lower surface thereof can each be provided in a flat structure.

The lens part 120 can be disposed on the one surface of the first base film 110 and can include a base layer 121, a plurality of optical patterns 123, and a cover layer 125.

The base layer 121 can support the plurality of optical patterns 123. In detail, the base layer 121 can be formed of the same material as that of each of the plurality of optical patterns 123 and can provide a base where the plurality of optical patterns 123 are provided. That is, a refractive index of each of the plurality of optical patterns 123 can be the same as that of the base layer 121, and a path of light passing through the lens part 120 can be determined based on the refractive index, shape, and arrangement of the plurality of optical patterns 123. For example, the plurality of optical patterns 123 can be regularly arranged to form a plurality of matrixes on the base layer 121, or can be irregularly arranged to have different pitches.

The plurality of optical patterns 123 can be provided as convex patterns in an upper surface of the base layer 121. For example, the plurality of optical patterns 123 can be spaced apart from at certain intervals, but are not limited thereto and can be provided adjacent to one another.

An upper surface of each of the plurality of optical patterns 123 can have a cross-sectional structure having a curve shape, such as an arch shape, and the cross-sectional structures of the upper surfaces of the plurality of optical patterns 123 can be provided identically. Here, the shape and arrangement of the plurality of optical patterns 123 can be modified based on a detailed configuration of the light control film 100, but the present disclosure is not limited thereto. Accordingly, the shape and arrangement of the plurality of optical patterns 123 can be modified according to various embodiments, for controlling a path of light passing through the lens part 120.

According to an embodiment, the shape and arrangement of the plurality of optical patterns 123 can be determined for improving an image based on a side viewing angle in a first direction X and a second direction Y. For example, the first direction X can correspond to a first horizontal direction (for example, a widthwise direction) of a planar surface of the light control film 100, and the second direction Y can correspond to a second horizontal direction (for example, a lengthwise direction) of the planar surface of the light control film 100.

According to an embodiment, the plurality of optical patterns 123 can be formed through a process of pressurizing a material layer by using a stamper after the material layer is coated on the base layer 121. In this situation, the stamper can have a shape of a plurality of concave patterns corresponding to a shape of the plurality of optical patterns 123. According to another embodiment, the plurality of optical patterns 123 can be provided as one body with the base layer 121.

The cover layer 125 can be disposed on the plurality of optical patterns 123. In detail, the cover layer 125 can cover the plurality of optical patterns 123 to provide a flat surface on the plurality of optical patterns 123.

According to an embodiment, the cover layer 125 can be formed through a process of pressurizing a material layer by using the stamper after the material layer is coated on the one surface of the first base film 110. For example, the cover layer 125 can be engraved and patterned to correspond to a shape of the plurality of optical patterns 123. Here, the material layer can correspond to ultraviolet (UV) resin or photoresist. That is, the stamper can engrave and pattern the cover layer 125 to determine a shape of the plurality of optical patterns 123 corresponding to the cover layer 125.

Therefore, the cover layer 125 can be engraved and patterned in the one surface of the first base film 110, the plurality of optical patterns 123 can be provided in the upper surface of the base layer 121, and the plurality of optical patterns 123 can be bonded to the cover layer 125, thereby forming the lens part 120.

The cover layer 125 can be formed of a material differing from that of each of the plurality of optical patterns 123. In detail, the cover layer 125 can be formed of a material having a refractive index which is higher than that of each of the plurality of optical patterns 123, or can be formed of a material having a refractive index which is lower than that of each of the plurality of optical patterns 123. For example, a refractive index difference between the plurality of optical patterns 123 and the cover layer 125 can be within a range of 0.05 to 0.4. For example, when the refractive index difference between the plurality of optical patterns 123 and the cover layer 125 is outside the range, an effect of solving a problem where a bluish image is displayed can be reduced.

As described above, the display apparatus including the light control film 100 including the lens part 120 can solve a problem where a bluish image is displayed with respect to the side viewing angle. For example, a display apparatus which does not include the light control film 100 may have a problem where a bluish image is displayed with respect to the side viewing angle. Accordingly, the light control film 100 according to embodiments of the present disclosure can be coupled to a display panel to increase the amount of emitted long-wavelength light compared to short-wavelength light with respect to the side viewing angle and can control a bluish image occurring in the display panel, thereby finally displaying a high-quality image.

The viewing angle controller 130 can be disposed on the other surface of the first base film 110 and can include a plurality of slits 133. In detail, the viewing angle controller 130 can include a light transmitting part 131 and a light absorbing part (in the plurality of slits) which are alternately disposed on a planar surface, and the light absorbing part can be disposed in each of the plurality of slits 133.

According to an embodiment, the light transmitting part 131 can be formed through a process of pressurizing a material layer by using the stamper after the material layer is coated on the other surface of the first base film 110. Here, the material layer can correspond to UV resin or photoresist. That is, the stamper can form the light transmitting part 131 and can simultaneously form the plurality of slits 133 corresponding to the light transmitting part 131. Therefore, the stamper can determine a shape of the plurality of slits 133 corresponding to the light absorbing part. Also, the light absorbing part can be formed by injecting a light absorbing material into the plurality of slits 133.

The plurality of slits 133 can be surrounded by the light transmitting part 131 and the adhesive layer 140 and can correspond to concave parts provided at certain intervals in the light transmitting part 131. According to an embodiment, the plurality of slits 133 can extend in the first direction X and can be spaced apart from one another in the second direction Y vertical to the first direction X. For example, the first direction X can correspond to the first horizontal direction (for example, the widthwise direction) of the planar surface of the light control film 100, and the second direction Y can correspond to the second horizontal direction (for example, the lengthwise direction) of the planar surface of the light control film 100.

According to an embodiment, a distance between adjacent slits of the plurality of slits 133 can be 50 μm or less. In detail, when a distance between adjacent slits of the plurality of slits 133 is greater than 50 μm, side light emitted from the display panel may not be blocked by the plurality of slits 133. Therefore, when a distance between adjacent slits of the plurality of slits 133 spaced apart from one another in the second direction Y is 50 μm or less, the plurality of slits 133 can efficiently block the side light, thereby reinforcing security and decreasing a phase-shown phenomenon. Also, the viewing angle controller 130 can decrease the phase-shown phenomenon to secure outdoor visibility.

The light absorbing part can include a light absorbing material filled into each of the plurality of slits 133. In detail, when the light control film 100 is attached on the display panel, the light control film 100 can transmit front light emitted from the display panel and can block (or absorb) the side light. For example, when the plurality of slits 133 extend in the first direction X and are spaced apart from one another in the second direction Y vertical to the first direction X, the viewing angle controller 130 can transmit the front light and first-direction side light and can block second-direction side light.

Therefore, since the light control film 100 according to embodiments of the present disclosure includes the lens part 120 including the plurality of optical patterns 123 and the viewing angle controller 130 including the plurality of slits 133, an image based on the side viewing angle in the first direction X can be improved by the lens part 120, and the viewing angle controller 130 can block the second-direction side light to control the side viewing angle.

The protective film 150 can be attached on the viewing angle controller 130 by the adhesive layer 140. For example, the protective film 150 can be formed of a transparent material and can protect the light control film 100 from an external impact.

Figure 2:
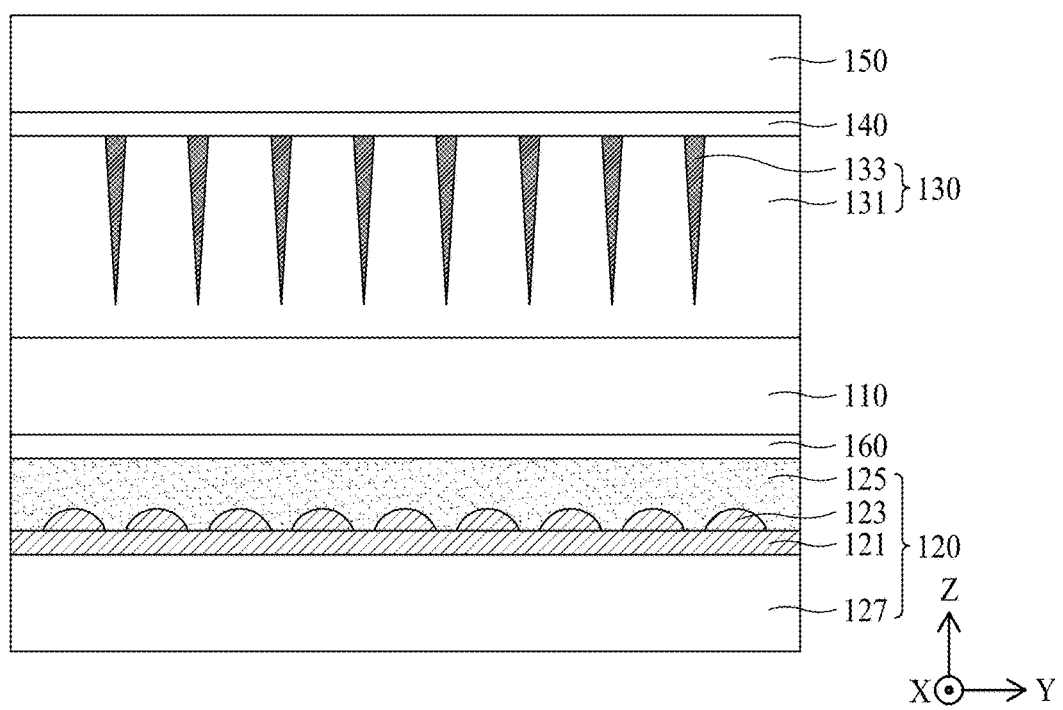
FIG. 2 is a cross-sectional view illustrating a light control film according to another embodiment of the present disclosure.

FIG. 2 is a cross-sectional view illustrating a light control film 100 according to a second embodiment of the present disclosure. Except for that a configuration of a lens part 120 is modified, the light control film of FIG. 2 is substantially the same as the light control film of FIG. 1, and thus, descriptions of the same elements as the above-described elements will be briefly given below or are omitted.

Referring to FIG. 2, a lens part 120 can be disposed on one surface of a first base film 110 and can include a base layer 121, a plurality of optical patterns 123, a cover layer 125, and a third base film 127.

The base layer 121 can support the plurality of optical patterns 123. In detail, the base layer 121 can be formed of the same material as that of each of the plurality of optical patterns 123 and can provide a base where the plurality of optical patterns 123 are provided.

The plurality of optical patterns 123 can be provided as convex patterns in an upper surface of the base layer 121. Also, the cover layer 125 can be disposed on the plurality of optical patterns 123. In detail, the cover layer 125 can cover the plurality of optical patterns 123 to provide a flat surface on the plurality of optical patterns 123.

The third base film 127 can support the base layer 121 and the plurality of optical patterns 123. In detail, the third base film 127 can support the base layer 121 and the plurality of optical patterns 123 in a process of sequentially forming the base layer 121, the plurality of optical patterns 123, and the cover layer 125. For example, the third base film 127 can be formed of a transparent material, and an upper surface and a lower surface thereof can each be provided in a flat structure.

Therefore, the lens part 120 can be formed by sequentially providing the base layer 121, the plurality of optical patterns 123, and the cover layer 125 on the third base film 127, and the cover layer 125 can be attached on the one surface of the first base film 110 by an adhesive layer 160.

As described above, the light control film 100 according to the second embodiment of the present disclosure can be characterized in that the viewing angle controller 130 and the lens part 120 are respectively provided on an upper surface of the first base film 110 and an upper surface of the third base film 127 and are bonded to each other by the adhesive layer 160.

Figure 3:
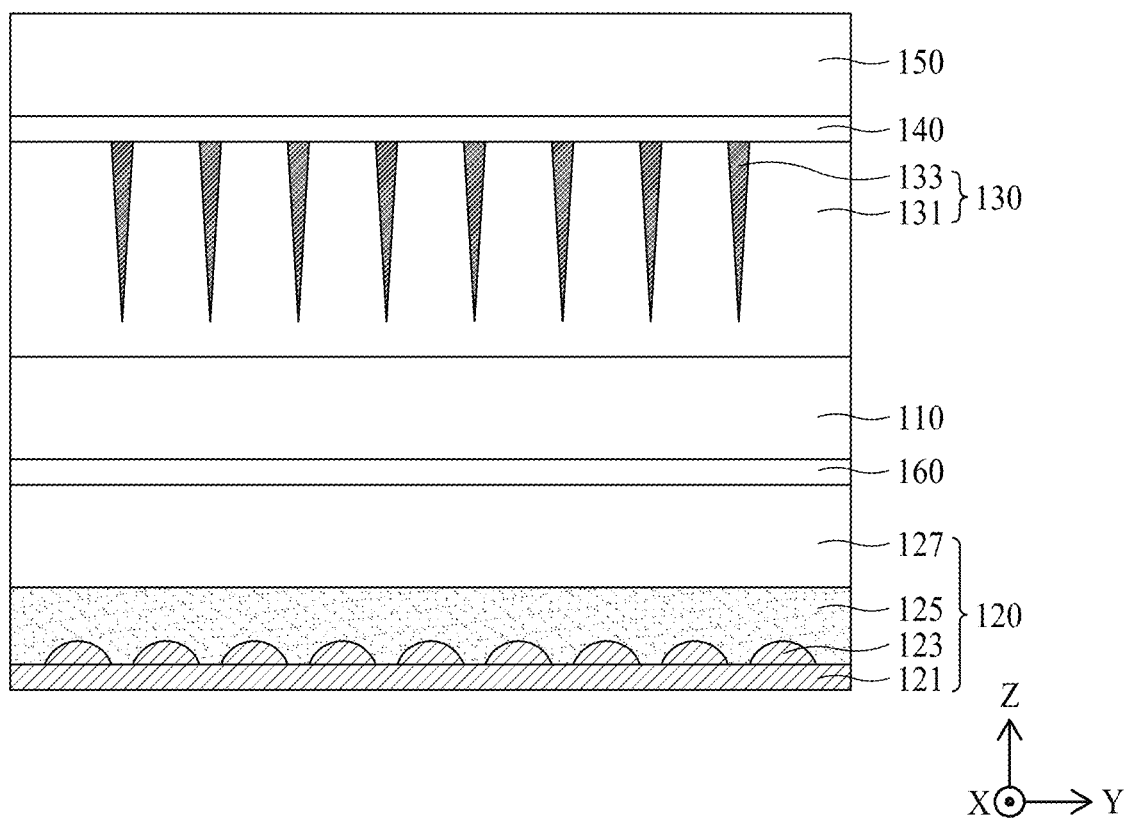
FIG. 3 is a cross-sectional view illustrating a light control film according to an embodiment of the present disclosure.

FIG. 3 is a cross-sectional view illustrating a light control film 100 according to a third embodiment of the present disclosure. Except for that a configuration of a lens part 120 is modified, the light control film of FIG. 3 is substantially the same as the light control film of each of FIGS. 1 and 2, and thus, descriptions of the same elements as the above-described elements will be briefly given below or are omitted.

Referring to FIG. 3, a lens part 120 can be disposed on one surface of a first base film 110 and can include a base layer 121, a plurality of optical patterns 123, a cover layer 125, and a third base film 127.

The base layer 121 can support the plurality of optical patterns 123. In detail, the base layer 121 can be formed of the same material as that of each of the plurality of optical patterns 123 and can provide a base where the plurality of optical patterns 123 are provided.

The plurality of optical patterns 123 can be provided as convex patterns in an upper surface of the base layer 121. Also, the cover layer 125 can be disposed on the plurality of optical patterns 123. In detail, the cover layer 125 can cover the plurality of optical patterns 123 to provide a flat surface on the plurality of optical patterns 123.

The third base film 127 can be attached on the one surface of the first base film 110 by an adhesive layer 160. For example, the third base film 127 can be formed of a transparent material, and an upper surface and a lower surface thereof can each be provided in a flat structure.

According to an embodiment, the cover layer 125 can be formed through a process of pressurizing a material layer by using the stamper after the material layer is coated on one surface of the third base film 127. For example, the cover layer 125 can be engraved and patterned to correspond to a shape of the plurality of optical patterns 123. Here, the material layer can correspond to UV resin or photoresist. That is, the stamper can engrave and pattern the cover layer 125 to determine a shape of the plurality of optical patterns 123 corresponding to the cover layer 125.

Therefore, the cover layer 125 can be engraved and patterned the one surface of the third base film 127 disposed in the one surface of the first base film 110, the plurality of optical patterns 123 can be provided in an upper surface of the base layer 121, and the plurality of optical patterns 123 can be bonded to the cover layer 125, thereby forming the lens part 120.

As described above, the light control film 100 according to the third embodiment of the present disclosure can be characterized in that a viewing angle controller 130 is provided in the other surface of the first base film 110, the lens part 120 is provided on the one surface of the third base film 127, the viewing angle controller 130 and the lens part 120 are bonded to each other by the adhesive layer 160.

Figure 4:
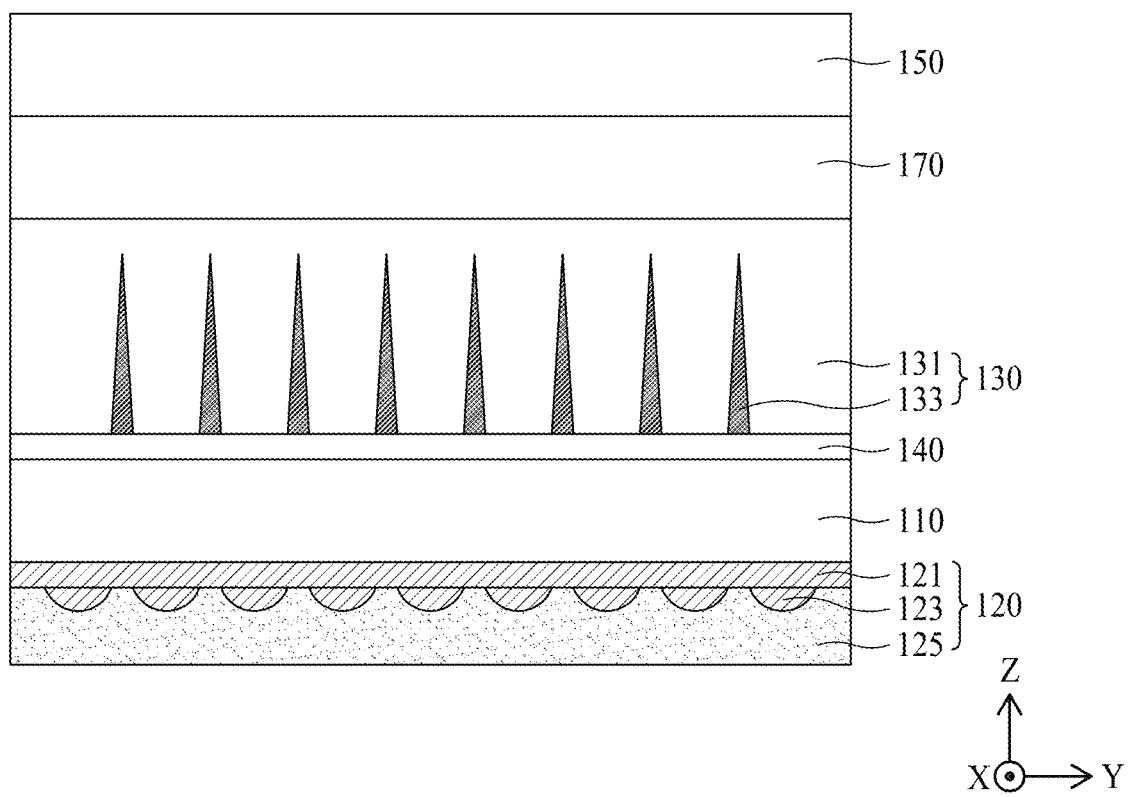
FIG. 4 is a cross-sectional view illustrating a light control film according to another embodiment of the present disclosure.

FIG. 4 is a cross-sectional view illustrating a light control film 100 according to a fourth embodiment of the present disclosure. Except for that a configuration of each of a lens part 120 and a viewing angle controller 130 is modified, the light control film of FIG. 4 is substantially the same as the light control film of each of FIGS. 1 to 3, and thus, descriptions of the same elements as the above-described elements will be briefly given below or are omitted. For example, the light control film 100 of FIG. 4 can correspond to a structure which is implemented by reversing an upper portion and a lower portion of each of the lens part 120 and the viewing angle controller 130 of the light control film of FIG. 1. According to an embodiment, in the light control film 100 illustrated in each of FIGS. 1 to 4, at least one of the lens part 120 and the viewing angle controller 130 can be disposed in a structure where an upper portion and a lower portion thereof are reversed.

Referring to FIG. 4, the light control film 100 can include a first base film 110, a lens part 120, a viewing angle controller 130, an adhesive layer 140, and a second base film 170. Optionally, the light control film 100 can further include a protective film 150 which protects an upper surface of the second base film 170.

The lens part 120 can be disposed on one surface of the first base film 110 and can include a base layer 121, a plurality of optical patterns 123, and a cover layer 125.

The base layer 121 can support the plurality of optical patterns 123. In detail, the base layer 121 can be formed of the same material as that of each of the plurality of optical patterns 123 and can provide a base where the plurality of optical patterns 123 are provided.

The plurality of optical patterns 123 can be provided as convex patterns in a lower surface of the base layer 121. Also, the cover layer 125 can be disposed on the plurality of optical patterns 123. In detail, the cover layer 125 can cover the plurality of optical patterns 123 to provide a flat surface on one surface of each of the plurality of optical patterns 123.

According to an embodiment, the base layer 121 can be provided in the one surface of the first base film 110, the plurality of optical patterns 123 can be provided on the one surface of the base layer 121, and the cover layer 125 can cover the one surface of each of the plurality of optical patterns 123. Accordingly, the base layer 121, the plurality of optical patterns 123, and the cover layer 125 can be formed sequentially from the one surface of the first base film 110.

As described above, the light control film 100 can include the base layer 121, the plurality of optical patterns 123, and the cover layer 125 which are sequentially disposed in the one surface of the first base film 110, thereby solving a problem where a bluish image is displayed with respect to the side viewing angle.

The viewing angle controller 130 can be disposed between the other surface of the first base film 110 and one surface of the second base film 170 and can include a plurality of slits 133. In detail, the viewing angle controller 130 can include a light transmitting part 131 and a light absorbing part which are alternately disposed on a planar surface, and the light absorbing part can be disposed in each of the plurality of slits 133.

According to an embodiment, the light transmitting part 131 can be formed through a process of pressurizing a material layer by using the stamper after the material layer is coated on the one surface of the second base film 170. Here, the material layer can correspond to UV resin or photoresist. That is, the stamper can form the light transmitting part 131 and can simultaneously form the plurality of slits 133 corresponding to the light transmitting part 131. Therefore, the stamper can determine a shape of the plurality of slits 133 corresponding to the light transmitting part 131. Also, the light absorbing part can be formed by injecting a light absorbing material into the plurality of slits 133.

As described above, the plurality of slits 133 can be formed by pressurizing a material layer by using the stamper after the material layer including a material of the light transmitting part 131 is coated on the one surface of the second base film 170, and the viewing angle controller 130 can be attached on the other surface of the first base film 110 by the adhesive layer 140.

Moreover, the light control film 100 can include the viewing angle controller 130 including the plurality of slits 133 facing the other surface of the first base film 110, thereby improving an image based on the side viewing angle, reinforcing security, and decreasing a phase-shown phenomenon.

Figure 5A:
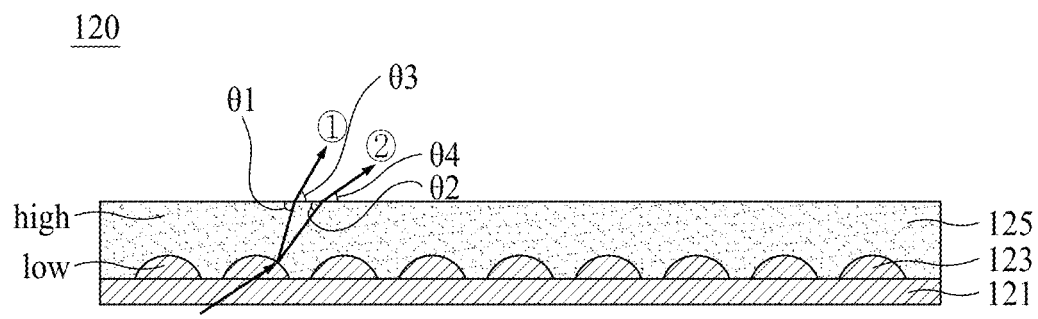
FIGS. 5A and 5B are diagrams illustrating a light path adjusted by units of wavelengths by using a lens part according to an embodiment of the present disclosure.
Figure 5B:
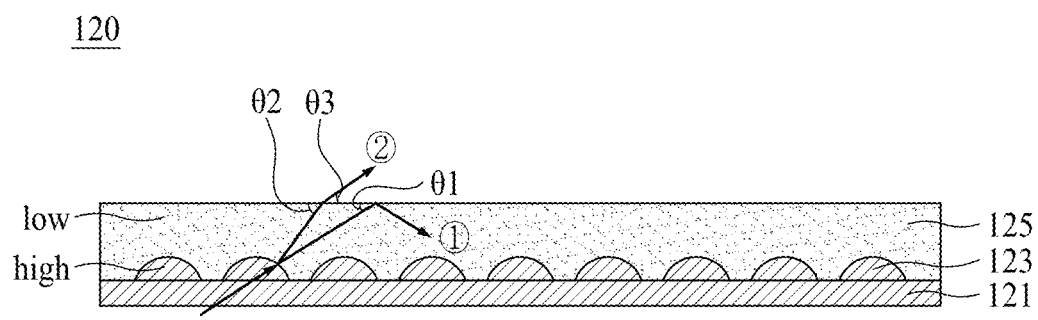

FIGS. 5A and 5B are diagrams illustrating a light path adjusted by units of wavelengths by using a lens part 120 according to an embodiment of the present disclosure.

Referring to FIGS. 5A and 5B, the lens part 120 can include a base layer 121, a plurality of optical patterns 123, and a cover layer 125.

In FIG. 5A, the base layer 121 and the plurality of optical patterns 123 can have a low refractive index which is lower than a refractive index of the cover layer 125, and the cover layer 125 can have a high refractive index which is higher than a refractive index of each of the base layer 121 and the plurality of optical patterns 123.

According to an embodiment, light incident on the lens part 120 can pass through an interface between the plurality of optical patterns 123 and the base layer 121 which have the same refractive index.

Moreover, when light is traveling from the plurality of optical patterns 123 having a low refractive index to the cover layer 125 having a high refractive index, a refractive shape of light can be changed by units of wavelengths in an interface therebetween. For example, short-wavelength light ① such as blue light can be refracted in a direction in which a first angle θ1 is formed with respect to an upper surface of the cover layer 125, and long-wavelength light ② such as red light can be refracted in a direction in which a second angle θ2 is formed with respect to the upper surface of the cover layer 125. That is, the short-wavelength light ① can be refracted to be more vertical than the long-wavelength light ② while passing through the interface between the plurality of optical patterns 123 and the cover layer 125.

Moreover, the short-wavelength light ① and the long-wavelength light ② each refracted in the interface between the plurality of optical patterns 123 and the cover layer 125 can be refracted again in the upper surface of the cover layer 125. In this situation, a portion on the cover layer 125 can include a material layer having a refractive index which is lower than that of the cover layer 125, and thus, the short-wavelength light ① can be discharged in a direction in which a third angle θ3 is formed with respect to the upper surface of the cover layer 125, and the long-wavelength light ② can be discharged in a direction in which a fourth angle θ4 is formed with respect to the upper surface of the cover layer 125.

As a result, the third angle θ3 at which the short-wavelength light ① is emitted from the upper surface of the cover layer 125 can be greater than the fourth angle θ4 at which the long-wavelength light ② is emitted from the upper surface of the cover layer 125. Accordingly, the light control film 100 according to embodiments of the present disclosure can increase the amount of emitted long-wavelength light ② compared to the amount of emitted short-wavelength light ① in a direction corresponding to the side viewing angle, thereby preventing a phenomenon where an image displayed by a display apparatus becomes bluish.

In FIG. 5B, a base layer 121 and a plurality of optical patterns 123 can have a high refractive index which is higher than a refractive index of a cover layer 125, and the cover layer 125 can have a low refractive index which is lower than a refractive index of each of the base layer 121 and the plurality of optical patterns 123.

According to an embodiment, light incident on a lens part 120 can pass through an interface between the plurality of optical patterns 123 and the base layer 121 which have the same refractive index.

Moreover, when light is traveling from the plurality of optical patterns 123 having a high refractive index to the cover layer 125 having a low refractive index, a refractive shape of light can be changed by units of wavelengths in an interface therebetween. In detail, short-wavelength light ① such as blue light can be refracted in a direction in which a first angle θ1 is formed with respect to an upper surface of the cover layer 125, and long-wavelength light ② such as red light can be refracted in a direction in which a second angle θ2 is formed with respect to the upper surface of the cover layer 125. That is, the long-wavelength light ② can be refracted to be more vertical than the short-wavelength light ① while passing through the interface between the plurality of optical patterns 123 and the cover layer 125.

Moreover, the short-wavelength light ① and the long-wavelength light ② each refracted in the interface between the plurality of optical patterns 123 and the cover layer 125 can be refracted again in the upper surface of the cover layer 125. In this situation, a first angle θ1 between the short-wavelength light ① and the upper surface of the cover layer 125 can be less, and due to this, the short-wavelength light ① may not be discharged from the upper surface of the cover layer 125 to the outside and can be totally reflected from the upper surface of the cover layer 125 (e.g., more blue light is internally reflected while more red light is allowed to escape to the side). On the other hand, a second angle θ2 between the long-wavelength light ② and the upper surface of the cover layer 125 can be greater than the first angle θ1, and thus, the long-wavelength light ② can be emitted in a direction in which a third angle θ3 is formed with respect to the upper surface of the cover layer 125.

Accordingly, the light control film 100 according to embodiments of the present disclosure can increase the amount of emitted long-wavelength light ② compared to the amount of emitted short-wavelength light ① in a direction corresponding to the side viewing angle, thereby preventing a phenomenon where an image displayed by a display apparatus becomes bluish.

As seen in FIGS. 5A and 5B, the light control film 100 according to embodiments of the present disclosure can appropriately adjust a refractive index of each of the cover layer 125 and the plurality of optical patterns 123, and thus, can adjust the amount of light emitted from the upper surface of the cover layer 125 by units of light wavelengths and can prevent an image from becoming bluish with respect to the side viewing angle. That is, the light control film 100 can use a characteristic where light has different refractive patterns by units of light wavelengths when passing through an interface between a high refractive layer and a low refractive layer, thereby improving the image quality of a display apparatus.

A refractive index difference between the plurality of optical patterns 123 and the cover layer 125 can be within a range of 0.05 to 0.4. For example, when the refractive index difference between the plurality of optical patterns 123 and the cover layer 125 is outside the range, since the amount of emitted long-wavelength light ② in the structure of FIG. 5A is reduced, a bluish image may still remain, and moreover, since the amount of emitted short-wavelength light ① in the structure of FIG. 5B increases, a bluish image may still remain.

As described above, the display apparatus including the light control film 100 including the lens part 120 can solve a problem where a bluish image is displayed with respect to the side viewing angle. For example, a display apparatus which does not include the light control film 100 may have a problem where a bluish image is displayed with respect to the side viewing angle. Accordingly, the light control film 100 according to embodiments of the present disclosure can be coupled to a display panel to increase the amount of emitted long-wavelength light compared to short-wavelength light with respect to the side viewing angle and can control a bluish image occurring in the display panel, thereby finally displaying a high-quality image.

Figure 6:
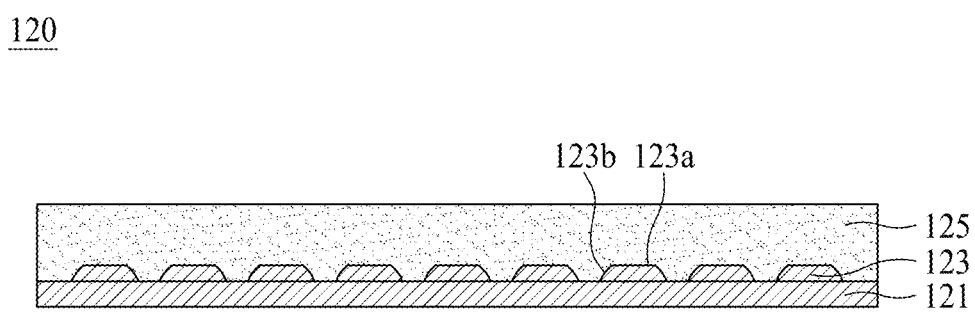
FIG. 6 is a cross-sectional view illustrating a lens part according to another embodiment of the present disclosure.

FIG. 6 is a cross-sectional view illustrating a lens part 120 according to another embodiment of the present disclosure. Except for that a configuration of each a plurality of optical patterns 123 is modified, the lens part of FIG. 6 is substantially the same as the lens part of each of FIGS. 1 to 4, and thus, descriptions of the same elements as the above-described elements will be briefly given below or are omitted.

Referring to FIG. 6, the lens part 120 can include a base layer 121, a plurality of optical patterns 123, and a cover layer 125.

According to an embodiment, a surface of each of the plurality of optical patterns 123 can include a flat surface 123a provided in a center region and a curve surface 123b provided in an edge region. That is, a portion of an upper surface of each of the plurality of optical patterns 123 can be the flat surface 123a, and the other portion of the upper surface can be the curve surface 123b.

Since the upper surface of each of the plurality of optical patterns 123 includes the flat surface 123a, the amount of light discharged to the outside of a light control film 100 via the flat surface 123a can increase, and thus, luminance of a display apparatus can be enhanced.

Figure 7:
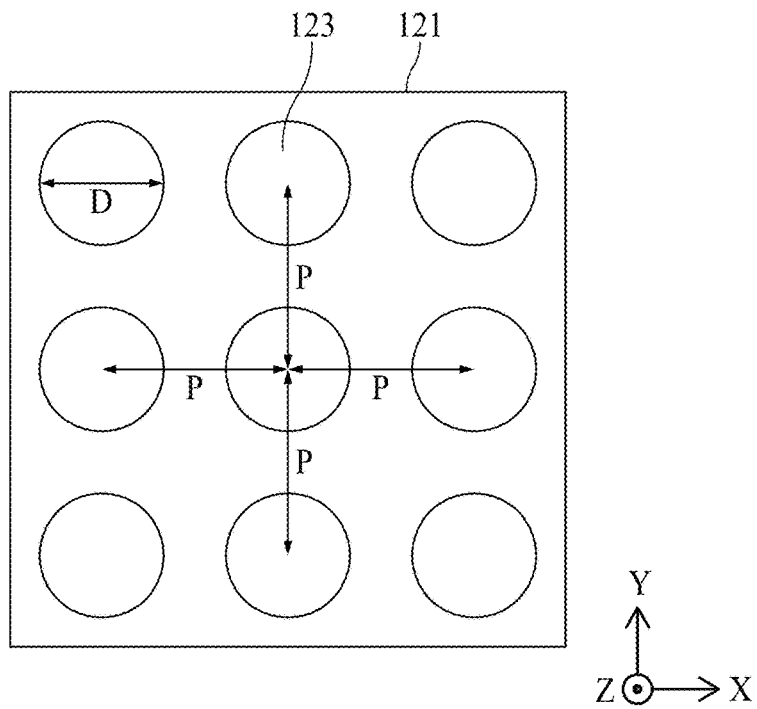
FIG. 7 is a plan view illustrating a plurality of optical patterns of a lens part according to an embodiment of the present disclosure.

FIG. 7 is a plan view illustrating a plurality of optical patterns 123 of a lens part according to an embodiment of the present disclosure.

Referring to FIG. 7, the plurality of optical patterns 123 can be provided on a base layer 121. Each of the plurality of optical patterns 123 can be provided in a one-dimensionally circular structure, but is not limited thereto and can be provided in an oval structure. Depending on the situation, each of the plurality of optical patterns 123 can be provided in a polygonal structure such as a pentagonal structure or a hexagonal structure.

According to an embodiment, diameters D of lower surfaces of the plurality of optical patterns 123 can be the same, and thus, the plurality of optical patterns 123 can have the same size. In this situation, the diameter D of the lower surface of each of the plurality of optical patterns 123 can be 20 μm or less. For example, when the diameter D of the lower surface of each of the plurality of optical patterns 123 is greater than 20 μm, an effect of changing a light path by units of light wavelengths according to embodiments of the present disclosure may not be obtained. Therefore, pitches P between the plurality of optical patterns 123 can be the same, and thus, the plurality of optical patterns 123 can be regularly arranged to form a plurality of matrixes.

Figure 8:
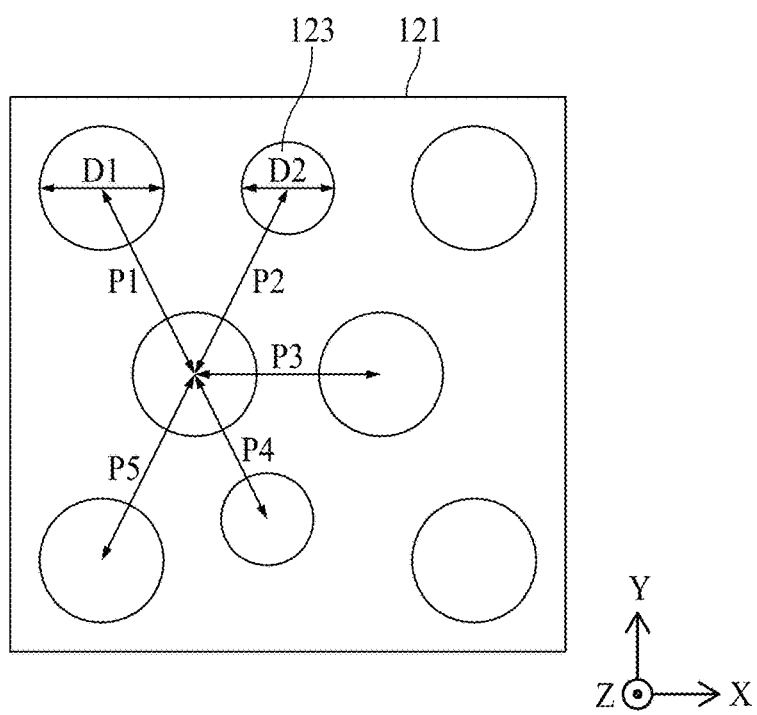
FIG. 8 is a plan view illustrating a plurality of optical patterns of a lens part according to another embodiment of the present disclosure.

FIG. 8 is a plan view illustrating a plurality of optical patterns 123 of a lens part according to another embodiment of the present disclosure.

Referring to FIG. 8, the plurality of optical patterns 123 can have different diameters D1 and D2 and can be irregularly arranged at different pitches P1 to P5.

For example, a first diameter D1 of a lower surface of one optical pattern 123 can differ from a second diameter D2 of a lower surface of one other optical pattern 123. That is, at least two of the plurality of optical patterns 123 can include lower surfaces having different sizes. Also, with respect to one optical pattern 123, at least two of first to fifth pitches P1 to P5 between other optical patterns 123 adjacent thereto can differ.

As described above, the plurality of optical patterns 123 can have the different diameters D1 and D2 and can be irregularly arranged at different pitches P1 to P5, thereby decreasing a moire phenomenon.

Figure 9:
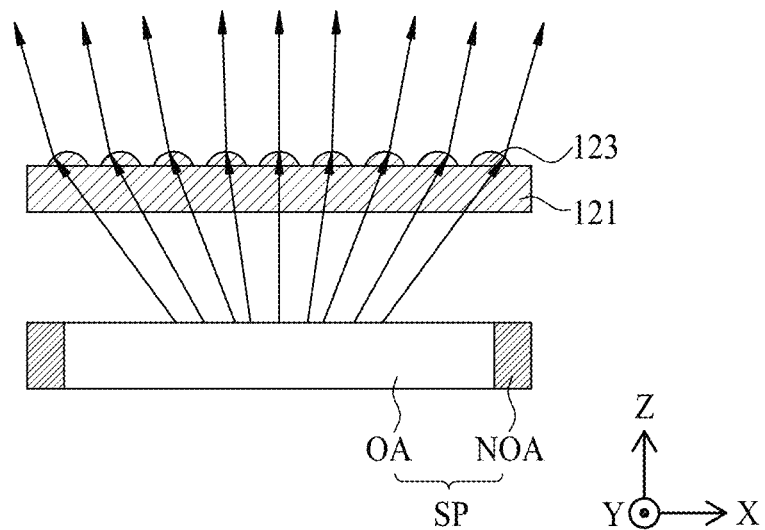
FIG. 9 is a diagram illustrating a light path in a situation where a plurality of optical patterns of a lens part according to an embodiment of the present disclosure are disposed on a display panel.

FIG. 9 is a diagram illustrating a light path in a situation where a plurality of optical patterns of a lens part according to an embodiment of the present disclosure are disposed on a display panel.

Referring to FIG. 9, a display panel can include a plurality of pixels, and each of the plurality of pixels can include a plurality of subpixels SP. Also, each of the plurality of subpixels SP can include an opening area OA and a non-opening area NOA.

The non-opening area NOA of each subpixel SP may not emit light. Light emitted from the opening area OA of each subpixel SP can be refracted while passing through a lens part 120, and thus, an output range can be enlarged to an area corresponding to the non-opening area NOA. Here, an air layer having a refractive index which is less than that of each of the plurality of optical patterns 123 can be provided on the plurality of optical patterns 123. For example, a refractive index of each of the plurality of optical patterns 123 can be 1.5 to 1.6 and a refractive index of the air layer can be 1, but the present disclosure is not limited thereto.

That is, light output in a direction that otherwise would not be viewable by a viewer's eyes can pass through the plurality of optical patterns 123 in the opening area OA of each subpixel SP, and thus, light can be refracted in a vertical direction that can be seen by the viewer due to a refractive index difference between the plurality of optical patterns 123 and the air layer on the plurality of optical patterns 123 and can be output from an area corresponding to the non-opening area NOA as well as the opening area OA. As described above, in a situation where visible light is output from an area corresponding to the non-opening area NOA of each subpixel SP, a virtual pixel can be provided in a corresponding area. Accordingly, an output range of each subpixel SP can be enlarged to an area corresponding to the non-opening area NOA.

Furthermore, light emitted from the opening area OA can pass through the plurality of optical patterns 123, and thus, an output range can be further enlarged through diffraction.

Therefore, in a situation where light output from the opening area OA of each subpixel SP passes through the plurality of optical patterns 123, visible light can be output from an area corresponding to the non-opening area NOA of each subpixel SP by adjusting a light path, and thus, lattice sensitivity where areas corresponding to the non-opening areas NOA of the subpixels SP are connected to one another and are recognized as a lattice form can be reduced and a sharp image can be maintained.

Accordingly, a light control film 100 can effectively decrease a lattice sensitivity of a virtual reality (VR) device which causes a user to watch an image in a state where eyes are close to a screen, and moreover, can effectively decrease image blurring where an image is blurred. For example, the refraction techniques regarding the optical patterns can hide the spaces between the sub-pixels and create a fuller and more uniform image, even when viewed very close up, as in a virtual reality (VR) device.

Figure 10A:
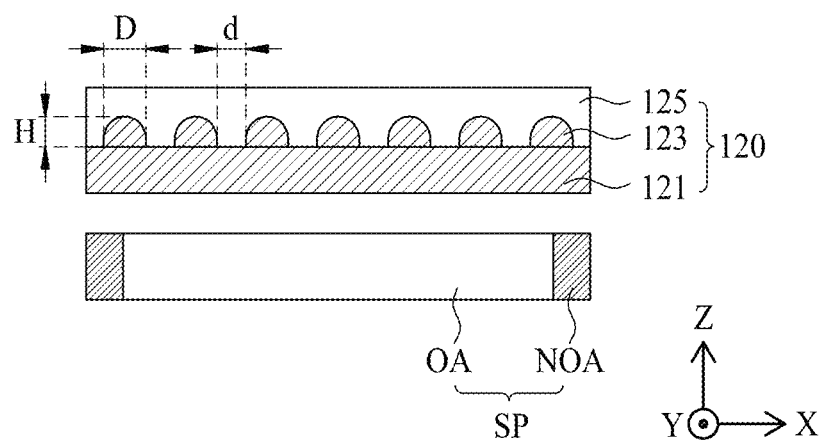
FIG. 10A is a cross-sectional view illustrating an example where a lens part according to an embodiment of the present disclosure is disposed on a display panel.

FIG. 10A is a cross-sectional view illustrating an example where a lens part 20 according to an embodiment of the present disclosure is disposed on a display panel.

Referring to FIG. 10A, a display panel can include a plurality of pixels, and each of the plurality of pixels can include a plurality of subpixels SP. Also, each of the plurality of subpixels SP can include an opening area OA and a non-opening area NOA.

The lens part 120 can be disposed on the display panel and can include a base layer 121, a plurality of optical patterns 123, and a cover layer 125.

The base layer 121 and the plurality of optical patterns 123 can each have a first refractive index, and the cover layer 125 can have a second refractive index which is less than the first refractive index. For example, the first refractive index can be 1.5 to 1.6 and the second refractive index can be 1.1 to 1.4, but the present disclosure is not limited thereto. According to an embodiment, a refractive index difference between the plurality of optical patterns 123 and the cover layer 125 can be within a range of 0.05 to 0.4. For example, when the refractive index difference between the plurality of optical patterns 123 and the cover layer 125 is outside the range, an effect of solving a problem where a bluish image is displayed can be reduced.

According to an embodiment, the base layer 121 and the plurality of optical patterns 123 can be formed of resin. For example, the base layer 121 and the plurality of optical patterns 123 can be formed of polyethylene terephthalate (PET), polycarbonate (PC), or an acrylic material, but are not limited thereto.

Moreover, in order to prevent light output from each subpixel SP from being output to an empty space between the plurality of optical patterns 123 and being recognized like color dispersion, a diameter D of a lower surface of each of the plurality of optical patterns 123 can be set to be greater than a separation distance d between the plurality of optical patterns 123. For example, the diameter D of a lower surface of each of the plurality of optical patterns 123 can be 20 µm or less and the separation distance d between the plurality of optical patterns 123 can be 5 µm or less, but the present disclosure is not limited thereto.

Therefore, the lens part 120 attached on the display panel can sharply maintain an image displayed by the display panel, and in order for lattice sensitivity to be invisible, a height H of each of the plurality of optical patterns 123 can be set to be greater than the diameter D of the lower surface. For example, a ratio of the height H to the diameter D of the lower surface of each of the plurality of optical patterns 123 can correspond to 1 to 2, but is not limited thereto.

Figure 10B:
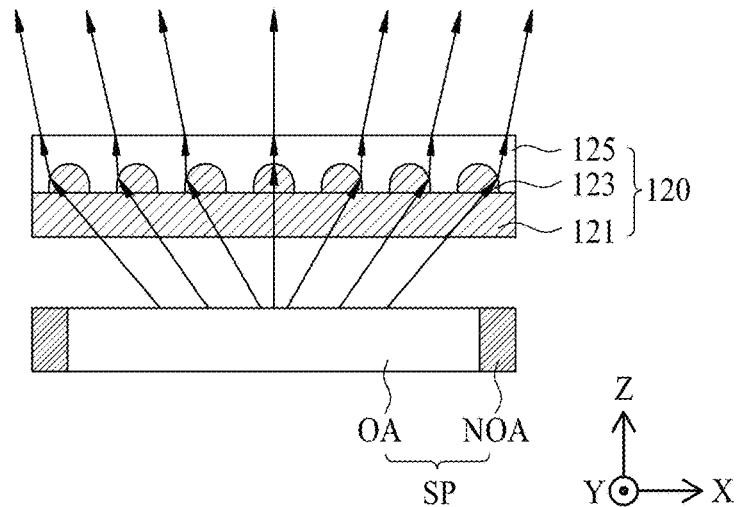
FIG. 10B is a diagram illustrating a light path in a situation where a lens part according to an embodiment of the present disclosure is disposed on a display panel.

FIG. 10B is a diagram illustrating a light path in a situation where a lens part according to an embodiment of the present disclosure is disposed on a display panel.

Referring to FIG. 10B, a non-opening area NOA of each subpixel SP may not emit light. Light emitted from an opening area OA of each subpixel SP can be refracted while passing through a lens part 120, and thus, an output range can be enlarged to an area corresponding to the non-opening area NOA. Here, an air layer having a refractive index which is less than that of each of a plurality of optical patterns 123 can be provided on the plurality of optical patterns 123.

That is, light output in a direction that otherwise would not be viewable to persons' eyes can pass through the plurality of optical patterns 123 in the opening area OA of each subpixel SP, and thus, light can be refracted in a vertical direction due that can be seen by the persons' eyes to a refractive index difference between the plurality of optical patterns 123 and the air layer on the plurality of optical patterns 123 and can be output from an area corresponding to the non-opening area NOA as well as the opening area OA. As described above, in a situation where visible light is output from an area corresponding to the non-opening area NOA of each subpixel SP, a virtual pixel can be provided in a corresponding area. Accordingly, an output range of each subpixel SP can be enlarged to an area corresponding to the non-opening area NOA.

Furthermore, light emitted from the opening area OA can pass through the plurality of optical patterns 123, and thus, an output range can be further enlarged through diffraction.

Therefore, in a situation where light output from the opening area OA of each subpixel SP passes through the plurality of optical patterns 123, visible light can be output from an area corresponding to the non-opening area NOA of each subpixel SP by adjusting a light path, and thus, lattice sensitivity where areas corresponding to the non-opening areas NOA of the subpixels SP are connected to one another and are recognized as a lattice form can be reduced and a sharp image can be maintained.

Accordingly, a light control film 100 can effectively decrease a lattice sensitivity of a VR device which causes a user to watch an image in a state where eyes are close to a screen, and moreover, can effectively decrease image blurring where an image is blurred.

Figure 11:
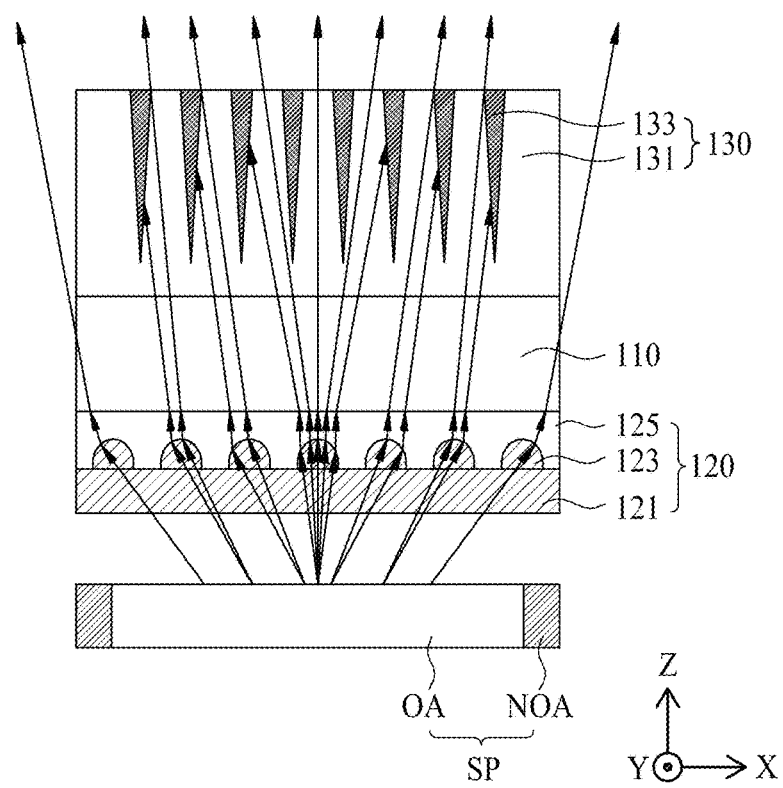
FIG. 11 is a diagram illustrating a light path in a situation where a light control film according to an embodiment of the present disclosure is disposed on a display panel.

FIG. 11 is a diagram illustrating a light path in a situation where a light control film 100 according to an embodiment of the present disclosure is disposed on a display panel.

Referring to FIG. 11, the light control film 100 can include a lens part 120 disposed on one surface of a first base film 110 and a viewing angle controller 130 disposed on the other surface of the first base film 110.

Light emitted from an opening area OA of a subpixel SP can be incident on the lens part 120, and visible light can be output to an area corresponding to a non-opening area NOA which is adjacent to the opening area OA in a first direction X and a second direction Y. Accordingly, the light control film 100 can decrease lattice sensitivity where areas corresponding to non-opening areas NOA adjacent to the opening area OA in the first direction X and the second direction Y are connected to one another and are recognized as a lattice form and can maintain a sharp image.

Furthermore, the viewing angle controller 130 can be disposed to overlap the lens part 120, and light output from the lens part 120 can be incident on the viewing angle controller 130. In this situation, the viewing angle controller 130 can include a plurality of slits 133 which extend in the first direction X and are spaced apart from one another in the second direction Y vertical to the first direction X, and a light absorbing part can be disposed in each of the plurality of slits 133. The light absorbing part can transmit side light which is output in the first direction X and can block side light which is output in the second direction Y.

Therefore, the lens part 120 can improve an image based on a side viewing angle in the first direction X, and the viewing angle controller 130 can block side light in the second direction Y, thereby preventing a bluish image from being displayed with respect to the side viewing angle in the first direction X, reinforcing security in the second direction Y, and decreasing a phase-shown phenomenon.

Figure 12:
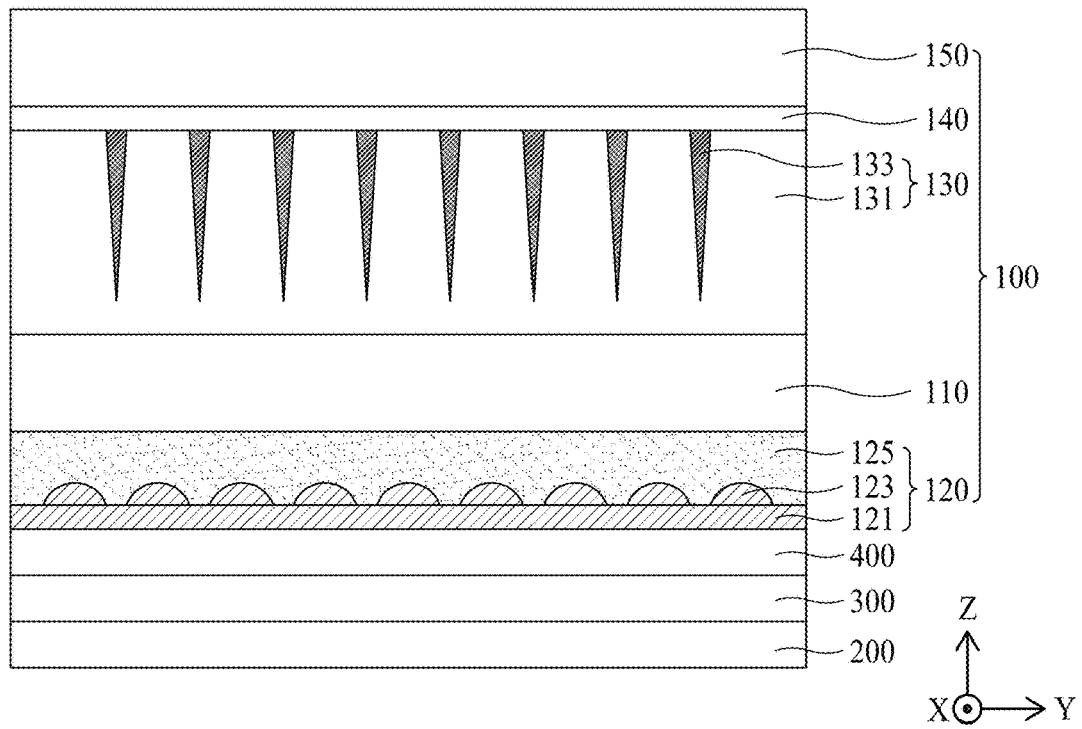
FIG. 12 is a cross-sectional view illustrating a display apparatus according to an embodiment of the present disclosure.
Figure 13:
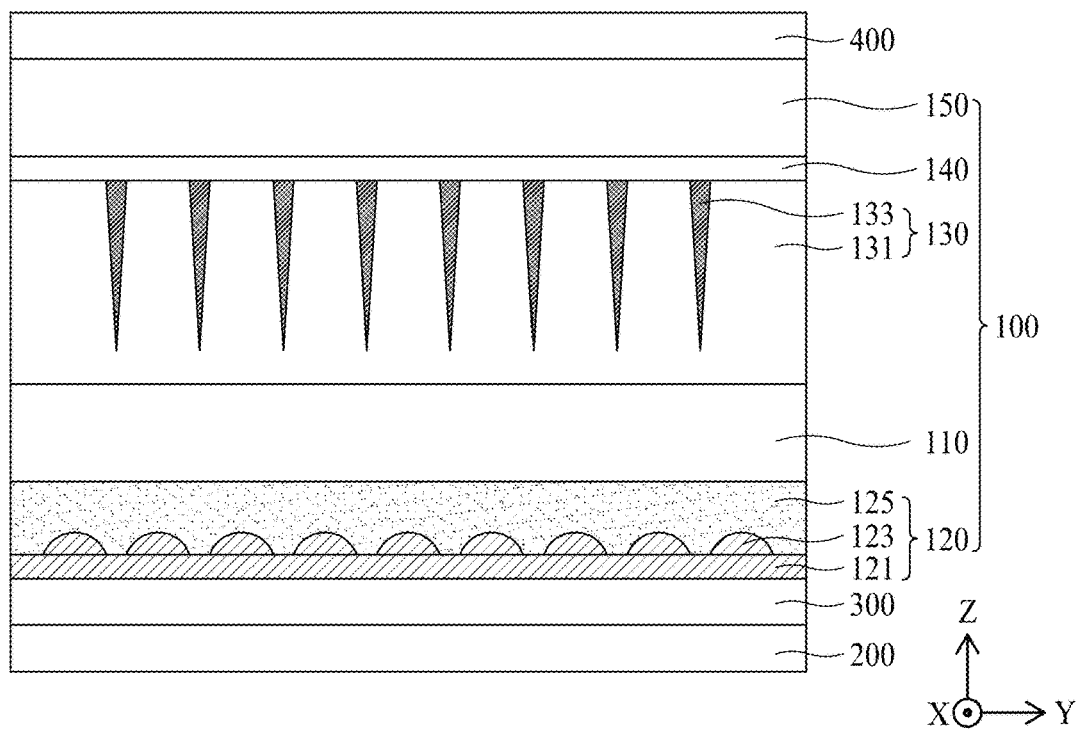
FIG. 13 is a cross-sectional view illustrating a display apparatus according to another embodiment of the present disclosure.
Figure 14:
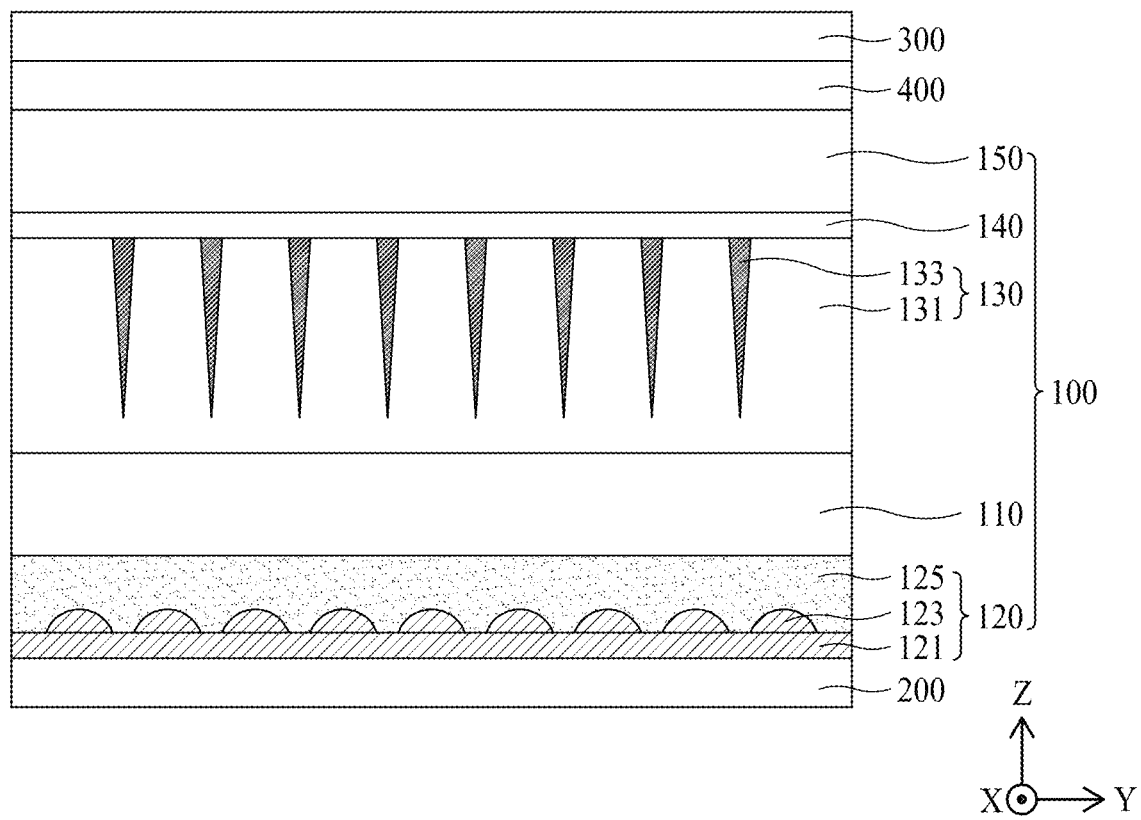
FIG. 14 is a cross-sectional view illustrating a display apparatus according to another embodiment of the present disclosure.

FIG. 12 is a cross-sectional view illustrating a display apparatus according to an embodiment of the present disclosure, FIG. 13 is a cross-sectional view illustrating a display apparatus according to another embodiment of the present disclosure, and FIG. 14 is a cross-sectional view illustrating a display apparatus according to another embodiment of the present disclosure.

Referring to FIGS. 12 to 14, a display apparatus according to an embodiment of the present disclosure can include a light control film 100, a display panel 200, a polarizing film 300, and a touch panel 400.

The display panel 200 can display an image. The polarizing film 300 can be disposed on the display panel 200. The touch panel 400 can be disposed on the polarizing film 300.

The polarizing film 300 can prevent the performance of the display apparatus from being reduced by interference between light emitted from the display panel 200 and external natural light (external light) which is input from the outside and is reflected by an internal reflector. An absorption axis of a polarizer and an optical axis (an absorption axis) of a phase difference compensation film can be aligned to be inclined, and thus, a waveform of the external light reflected by the internal reflector can rotate, whereby the polarizing film 300 can have a function of an antireflection filter.

The touch panel 400 can sense a user touch to enable conversational and intuitive manipulation, and thus, can function as an input device which enables the display apparatus and an electronic device including the display apparatus to be easily manipulated.

The light control film 100 can be disposed between the display panel 200 and the polarizing film 300, between the polarizing film 300 and the touch panel 400, and/or in an upper surface of the touch panel 400, thereby providing the above-described effect.

Figure 15:
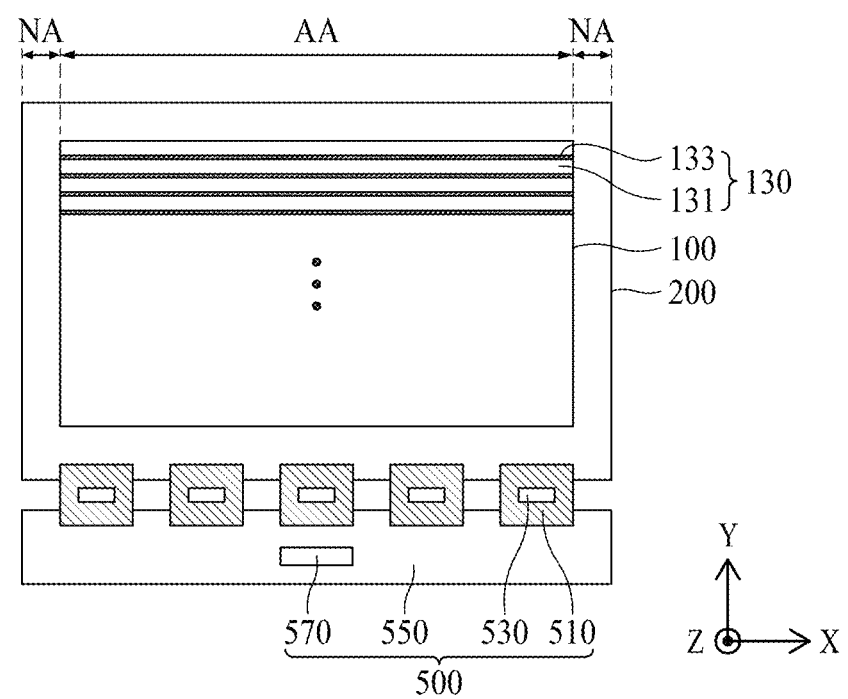
FIG. 15 is a plan view illustrating a display apparatus according to an embodiment of the present disclosure.

FIG. 15 is a plan view illustrating a display apparatus according to an embodiment of the present disclosure.

Referring to FIG. 15, the display apparatus can include a light control film 100, a display panel 200, and a display driving circuit unit 500.

The light control film 100 can be disposed on a front surface of the display panel 200. Also, the light control film 100 can be disposed to overlap a display area AA of the display panel 200. According to an embodiment, the light control film 100 can be attached on the display panel 200 by an adhesive member, or can be provided as one body with the display panel 200.

The light control film 100 can include a viewing angle controller 130 including a plurality of slits 133. In detail, the viewing angle controller 130 can include a light transmitting part 131 and a light absorbing part which are alternately disposed on a planar surface, and the light absorbing part can be disposed in each of the plurality of slits 133.

According to an embodiment, the plurality of slits 133 can extend in a first direction X and can be spaced apart from one another in a second direction Y vertical to the first direction X. For example, the first direction X can correspond to a first horizontal direction (for example, a widthwise direction) of the planar surface of the light control film 100, and the second direction Y can correspond to a second horizontal direction (for example, a lengthwise direction) of the planar surface of the light control film 100.

The light absorbing part can include a light absorbing material filled into each of the plurality of slits 133. For example, when the plurality of slits 133 extend in the first direction X and are spaced apart from one another in the second direction Y vertical to the first direction X, the viewing angle controller 130 can transmit front light and first-direction side light and can block second-direction side light. Therefore, the light control film 100 can be coupled to the display panel 200, and thus, the light control film 100 can transmit the front light emitted from the display panel 200 and the side light emitted in the first direction X and can block (or absorb) the side light emitted in the second direction Y.

As described above, the light control film 100 can be coupled to the display panel 200 to increase the amount of emitted long-wavelength light compared to short-wavelength light with respect to the side viewing angle and can control a bluish image occurring in the display panel 200, thereby finally displaying a high-quality image.

Moreover, the light control film 100 can be coupled to the display panel 200, and thus, the light control film 100 can transmit the front light emitted from the display panel 200 and can block (or absorb) the side light. For example, when the plurality of slits 133 extend in the first direction X and are spaced apart from one another in the second direction Y vertical to the first direction X, the viewing angle controller 130 can transmit the front light and the first-direction side light and can block the second-direction side light.

The display panel 200 can include a display area AA and a non-display area NA. The display area AA can be an area which displays an image and can correspond to a center portion of the display panel 200. The non-display area NA can be an area which does not display an image and can correspond to an edge portion, surrounding the display area AA, of the display panel 200. For example, the display panel 200 can use all types of display panels such as a liquid crystal display panel, an organic light emitting diode (OLED) display panel, and an electroluminescent display panel.

The display driving circuit unit 500 can include a plurality of circuit films 510, a plurality of driving integrated circuits (ICs) 530, a printed circuit board (PCB) 550, and a timing controller 570.

Each of the plurality of circuit films 510 can be attached on a pad part of the display panel 200 and the PCB 550. For example, an input terminal provided in one side of each of the plurality of circuit films 510 can be attached on the PCB 550 through a film attachment process, and an output terminal provided in the other side of each of the plurality of circuit films 510 can be attached on the pad part of the display panel 200 through a film attachment process.

Each of the plurality of driving ICs 530 can be individually mounted on a corresponding circuit film of the plurality of circuit films 510. Each of the plurality of driving ICs 530 can receive a data control signal and pixel data each provided from the timing controller 570, convert the pixel data into a pixel-based analog data signal according to the data control signal, and supply the analog data signal to a corresponding data line.

The PCB 550 can support the timing controller 570 and can transfer signals and power between the elements of the display driving circuit unit 500.

The timing controller 570 can be mounted on the PCB 550 and can receive, through a user connector provided on the PCB 550, video data and a timing synchronization signal each supplied from a display driving system. Also, the timing controller 570 can generate the data control signal and a scan control signal on the basis of the timing synchronization signal, control a driving timing of each of the plurality of driving ICs 530 by using the data control signal, and control a driving timing of the gate driving circuit unit by using the scan control signal.

Figure 16A:
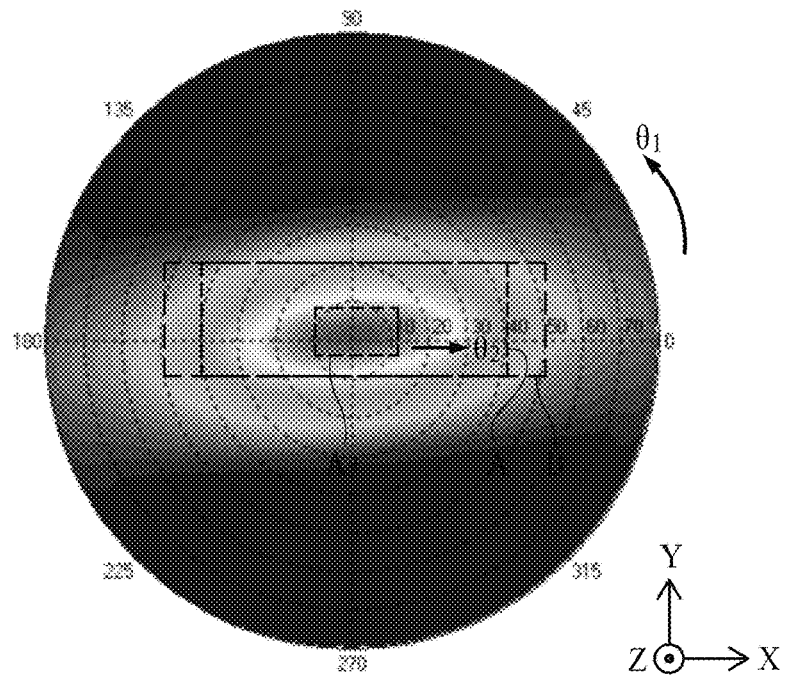
FIGS. 16A and 16B are diagrams illustrating an example where an image based on a side viewing angle is improved, in a display apparatus according to an embodiment of the present disclosure.
Figure 16B:
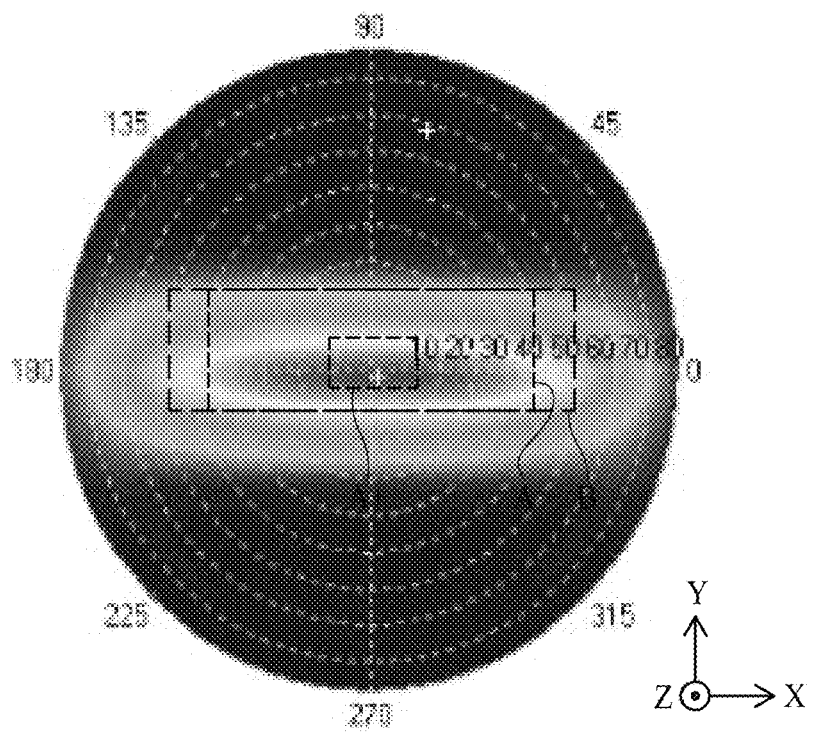

FIGS. 16A and 16B are diagrams illustrating an example where an image based on a side viewing angle is improved, in a display apparatus according to an embodiment of the present disclosure. Here, FIG. 16A illustrates a viewing luminance of a display apparatus including a light control film 100 which does not include a lens part 120, and FIG. 16B illustrates a viewing luminance of a display apparatus including a light control film 100 according to embodiments of the present disclosure. Also, in FIGS. 16A and 16B, a first angle θ1 can correspond to an angle of a planar surface provided in an X direction and a Y direction, and a second angle θ2 can correspond to an angle of a planar surface provided in the X direction and a Z direction. Also, luminance can correspond to high luminance in a direction closer to a region A+, and luminance can correspond to low luminance in a direction closer to a region B.

Referring to FIG. 16A, when a display panel 200 is simply coupled to the light control film 100 which does not include the lens part 120, a moire phenomenon may occur, causing the degradation in image quality. Therefore, the display apparatus including the light control film 100 which does not include the lens part 120 can be set a bias angle between the light control film 100 and the display panel 200 to improve an image based on a side viewing angle. When the bias angle between the light control film 100 and the display panel 200 is set, a problem where luminance is considerably reduced in at least one of four corners with respect to a side viewing field may occur.

For example, in a viewing luminance shown in FIG. 16A, it can be seen that luminance is considerably reduced in a left upper corner (θ1: 150 degrees) in a planar direction because the bias angle between the light control film 100 and the display panel 200 is set. Therefore, the display apparatus of FIG. 16A has a problem where a bluish image is displayed because the amount of emitted short-wavelength light such as blue light increases with respect to a side viewing angle of the left upper corner (θ1: 150 degrees) in the planar direction. Also, the display apparatus has a problem where color shift occurs because a viewing angle difference between a left side and a right side occurs.

Referring to FIG. 16B, the display apparatus including the light control film 100 according to embodiments of the present disclosure can include a lens part 120 including a plurality of optical patterns 123 and a viewing angle controller 130 including a plurality of slits 133. Accordingly, the display apparatus can prevent the occurrence of a moire phenomenon, even without a bias angle being set between the light control film 100 and the display panel 200. In other words, even when viewed close up, as in a VR type display device, visual grid lines due to the spaces between sub-pixels can be hidden from the viewer and image quality can be improved.

Since the bias angle is not set between the light control film 100 and the display panel 200, the display apparatus according to embodiments of the present disclosure can have uniform luminance in four corners with respect to a side viewing field. Also, the display apparatus according to embodiments of the present disclosure can increase the amount of emitted long-wavelength light such as red light to prevent a bluish image from being displayed and can remove a viewing angle difference between a left side and a right side to prevent the occurrence of color shift.

Additionally, the display apparatus according to embodiments of the present disclosure can include the lens part 120 and the viewing angle controller 130, and thus, may not need an additional film for improving an image.

Figure 17A:
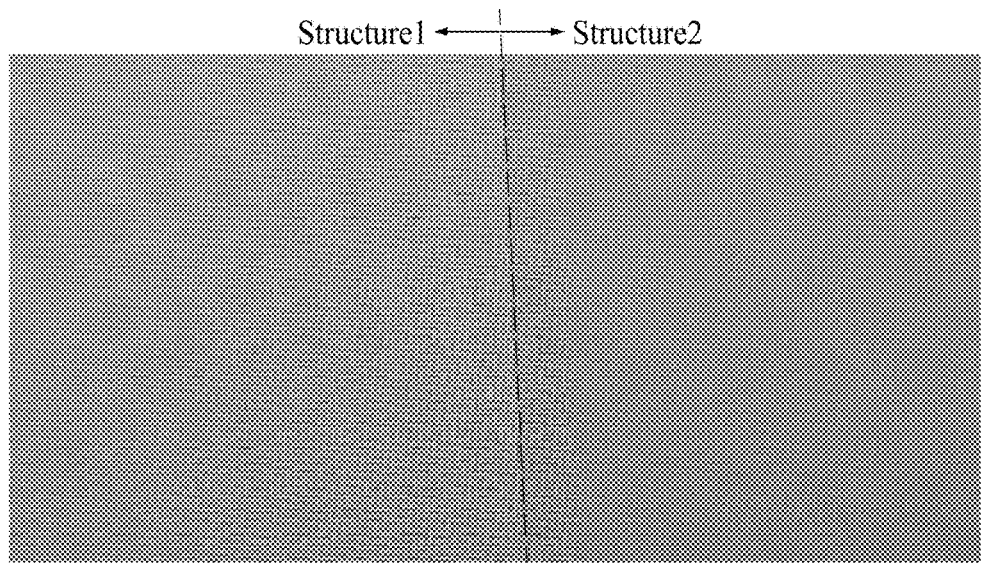
FIGS. 17A and 17B are diagrams illustrating an example where a moire phenomenon is reduced, in a display apparatus according to an embodiment of the present disclosure.
Figure 17B:
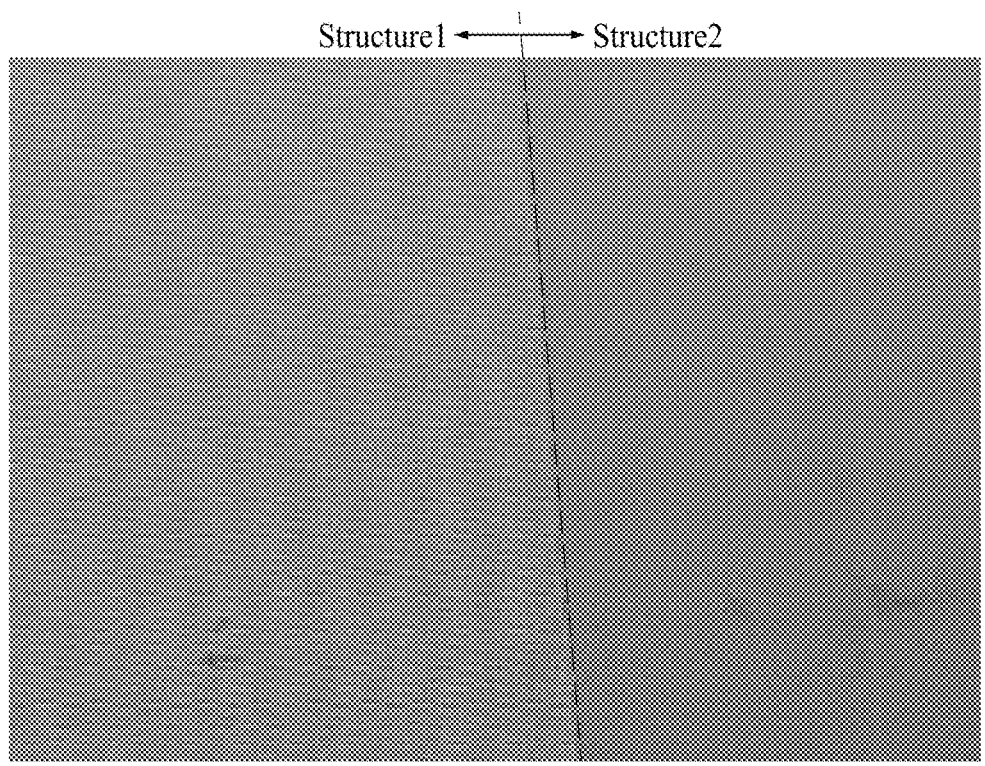

FIGS. 17A and 17B are diagrams illustrating an example where a moire phenomenon is reduced, in a display apparatus according to an embodiment of the present disclosure. Here, FIGS. 17A and 17B show the occurrence or absence of a moire phenomenon in samples 1 and 2 having the same condition. Also, a region of a structure 1 can correspond to a display apparatus including a light control film 100 which does not include a lens part 120, and a region of a structure 2 can correspond to a display apparatus including a light control film 100 according to embodiments of the present disclosure.

Therefore, referring to FIGS. 17A and 17B, it can be seen that a moire phenomenon appears in the region of the structure 1 due to the display apparatus including the light control film 100 which does not include the lens part 120, and a moire phenomenon does not appear in the region of the structure 2 due to the display apparatus including the light control film 100 according to embodiments of the present disclosure.

Figure 18:
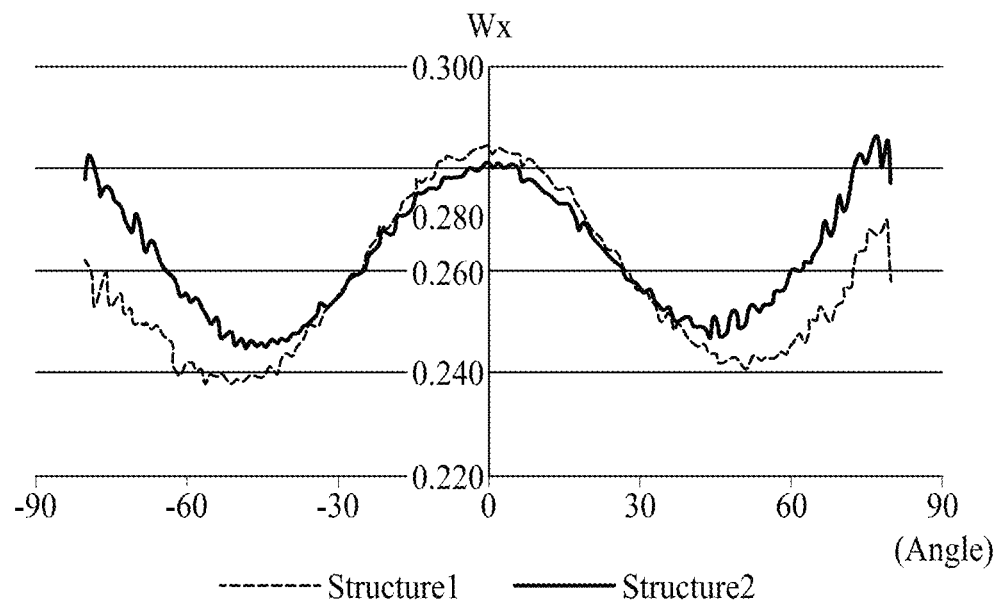
FIG. 18 is a diagram illustrating an effect of improving a viewing angle, in a display apparatus according to an embodiment of the present disclosure.
Figure 18:
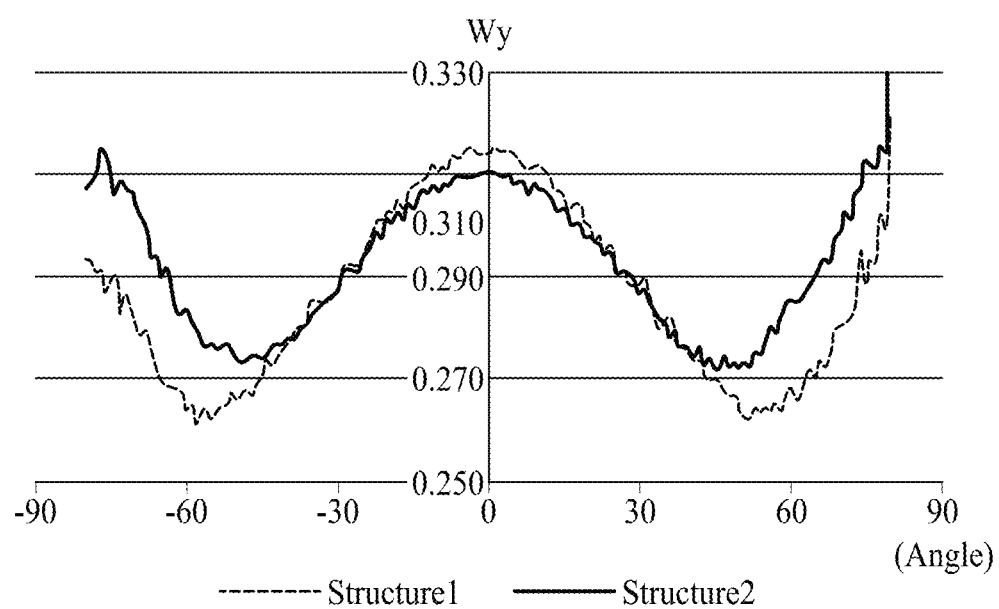

FIG. 18 is a diagram illustrating an effect of improving a viewing angle, in a display apparatus according to an embodiment of the present disclosure. In detail, FIG. 18 show an effect of improving a color viewing angle through color coordinates (Wx, Wy) with respect to a horizontal angle. Here, a structure 1 can correspond to a display apparatus including a light control film 100 which does not include a lens part 120, and a structure 2 can correspond to a display apparatus including a light control film 100 according to embodiments of the present disclosure.

Therefore, the display apparatus of the structure 2 can include a lens part 120 including a plurality of optical patterns 123 and a viewing angle controller 130 including a plurality of slits 133. Accordingly, comparing with the structure 1, it can be seen that a deviation between a maximum value and a minimum value of the color coordinates (Wx, Wy) is reduced in a whole horizontal angle region.

As described above, the light control film according to embodiments of the present disclosure can include a lens part for improving an image with respect to a side viewing angle in a first direction and a viewing angle controller for blocking side light in a second direction vertical to the first direction, thereby solving a problem where a bluish image is displayed with respect to the side viewing angle, reinforcing security with respect to a side viewing field in the second direction, and decreasing a phase-shown phenomenon.

Figure 19:
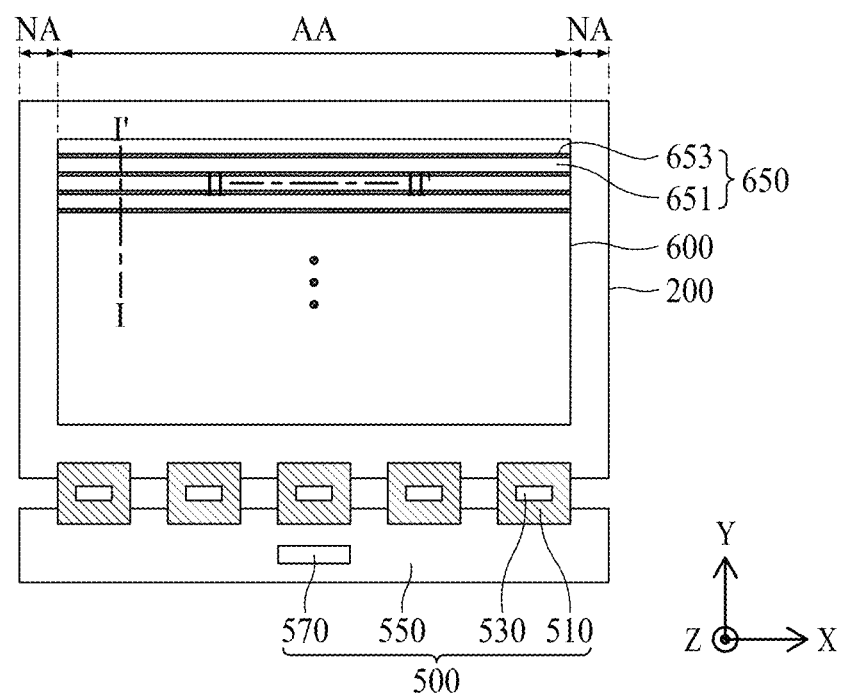
FIG. 19 is a plan view illustrating a display apparatus according to an embodiment of the present disclosure.
Figure 20:
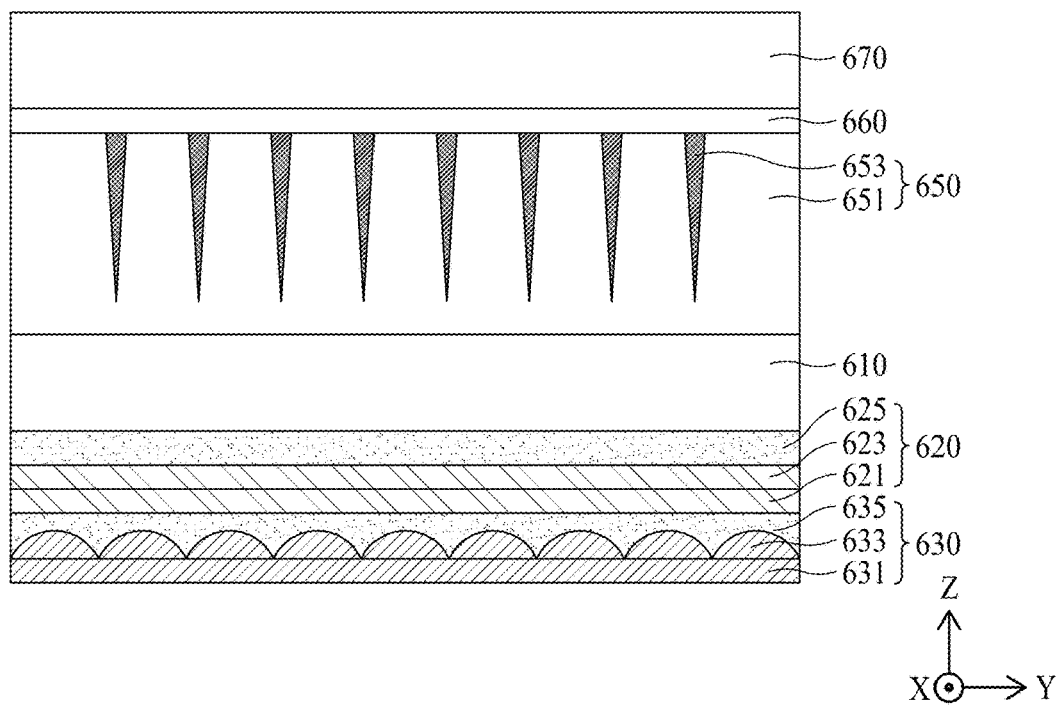
FIG. 20 is a cross-sectional view taken along line I-I' in an embodiment of a light control film illustrated in FIG. 19.
Figure 21:
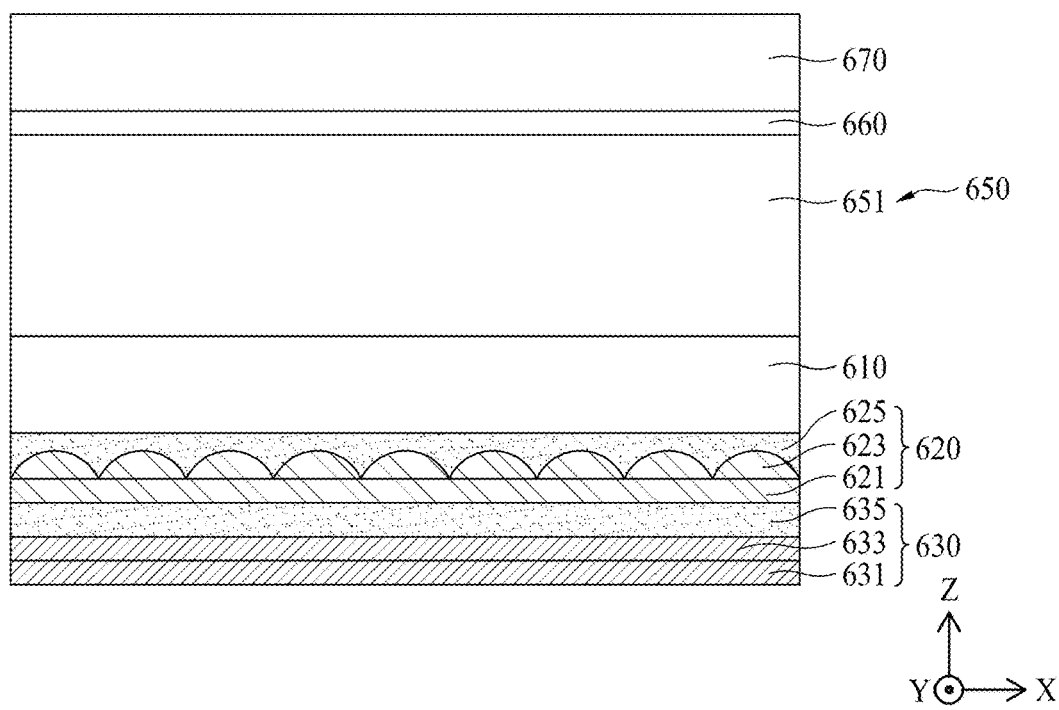
FIG. 21 is a cross-sectional view taken along line II-II' in an embodiment of the light control film illustrated in FIG. 19.
Figure 22:
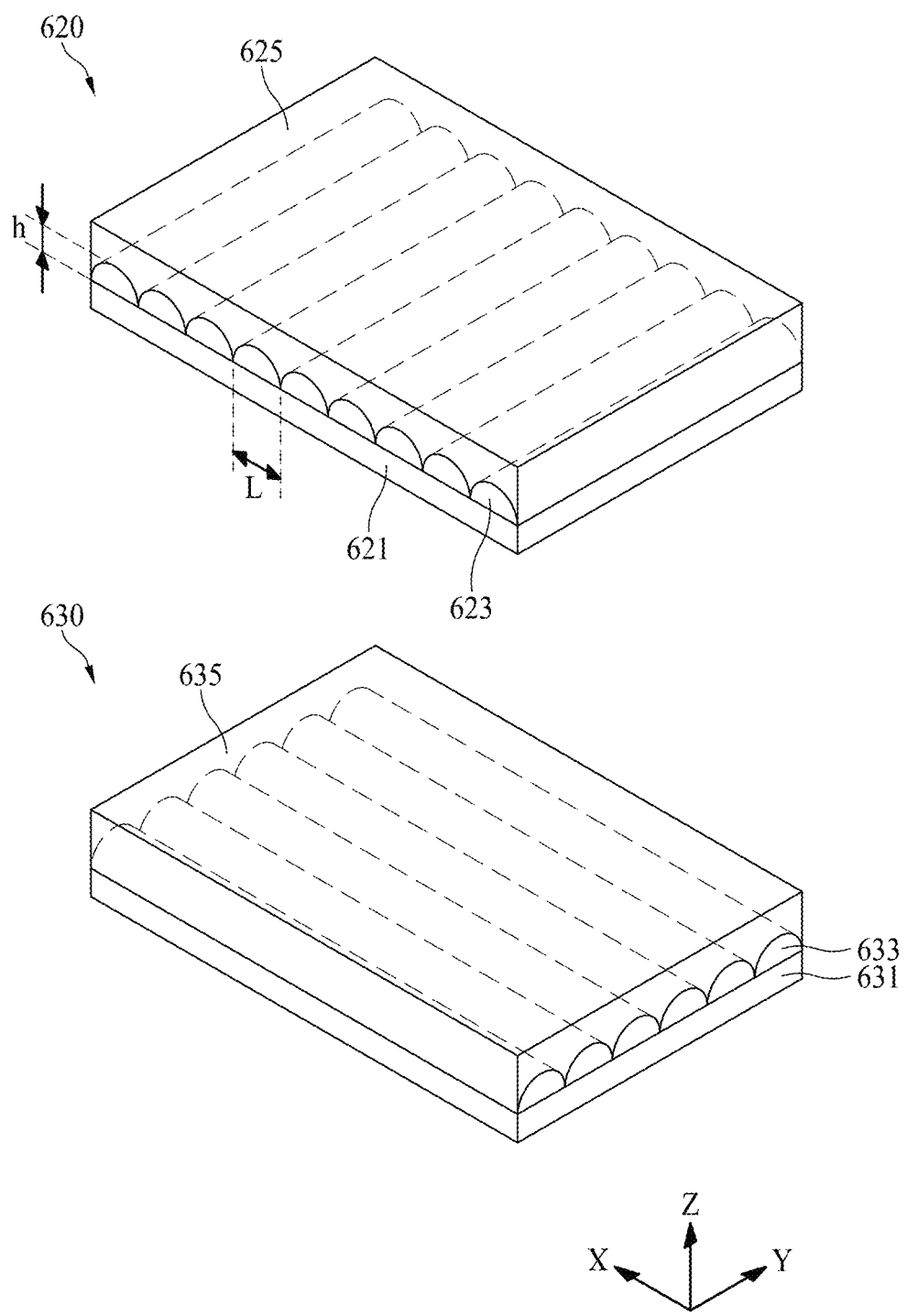
FIG. 22 is a perspective view illustrating first and second lens layers in an embodiment of the light control film illustrated in FIG. 19.
Figure 23:
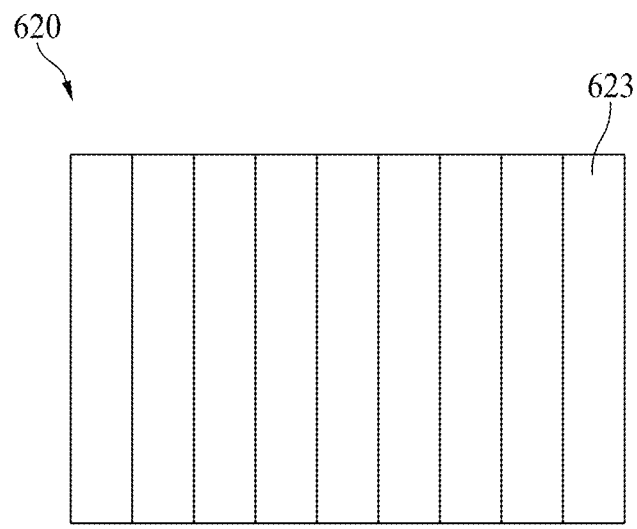
FIG. 23 is a plan view illustrating the first and second lens layers in an embodiment of the light control film illustrated in FIG. 19.
Figure 23:
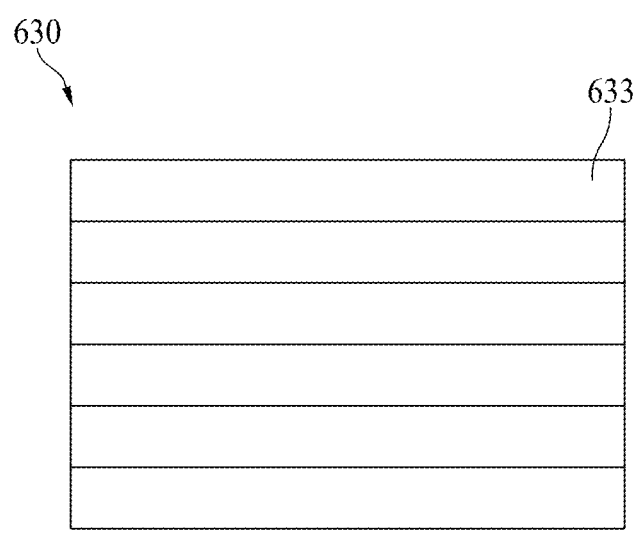

FIG. 19 is a plan view illustrating a display apparatus according to an embodiment of the present disclosure. FIG. 20 is a cross-sectional view taken along line I-I' in a fifth embodiment of a light control film illustrated in FIG. 19. FIG. 21 is a cross-sectional view taken along line II-II' in the fifth embodiment of the light control film illustrated in FIG. 19. FIG. 22 is a perspective view illustrating first and second lens layers in the fifth embodiment of the light control film illustrated in FIG. 19. FIG. 22 is a plan view illustrating the first and second lens layers in the fifth embodiment of the light control film illustrated in FIG. 19.

Referring to FIGS. 19 to 23, the display apparatus can include a light control film 600, a display panel 200, and a display driving circuit unit 500.

The light control film 600 can be disposed on a front surface of the display panel 200. Also, the light control film 600 can be disposed to overlap a display area AA of the display panel 200. According to an embodiment, the light control film 600 can be attached on the display panel 200 by an adhesive member, or can be provided as one body with the display panel 200.

The light control film 600 can include a first base film 610, a plurality of lens parts 620 and 630, a viewing angle controller 650, an adhesive layer 660, and a protective film 670.

The first base film 610 can include one surface facing the lens parts 620 and 630 and another surface facing the viewing angle controller 650. The one surface of the first base film 610 can support the lens parts 620 and 630 in a process of forming the lens parts 620 and 630, and the other surface of the first base film 610 can support the viewing angle controller 650 in a process of forming the viewing angle controller 650. For example, the first base film 610 can be formed of a transparent material, and an upper surface and a lower surface thereof can each be provided in a flat structure.

The lens parts can be disposed on the one surface of the first base film 610 and can include a first lens layer 620 and a second lens layer 630.

The first lens layer 620 can be disposed between the first base film 610 and the second lens layer 630. The first lens layer 620 can include a first base layer 621, a first optical pattern 623, and a first cover layer 625.

The first base layer 621 can support the first optical pattern 623. In detail, the first base layer 621 can be formed of the same material as that of the first optical pattern 623 and can provide a base where the first optical pattern 623 is provided. That is, a refractive index of the first optical pattern 623 can be the same as that of the first base layer 621, and a path of light passing through the first lens layer 621 can be determined based on the refractive index, shape, and arrangement of the first optical pattern 623. For example, the first optical pattern 623 can be regularly arranged to form a plurality of matrixes on the first base layer 621, or can be irregularly arranged to have different pitches.

The first optical pattern 623 can be provided in plurality, and the plurality of first optical patterns 623 can be arranged along a first axis Y of the first base film 610. Here, the first axis Y of the first base film 610 can correspond to a vertical axis of the first base film 610 and can be parallel to a second horizontal direction. For example, the first optical pattern 623 can extend along the first axis Y of the first base film 610. The first optical pattern 623 can be provided in plurality, and the plurality of first optical patterns 623 can be spaced apart from one another along a second axis X vertical to the first axis Y. As another example, the first optical patterns 623 can extend along the first axis Y of the first base film 610 and can be disposed adjacent to one another along the second axis X.

According to an embodiment, since the first optical pattern 623 extends along the first axis Y of the first base film 610, the first lens layer 620 can improve horizontal-direction luminance. Here, the horizontal-direction luminance can be defined with respect to a viewer who is watching a screen of the display apparatus. That is, light incident on the first lens layer 620 can be refracted in a horizontal direction in an interface between the first optical pattern 623 and the first cover layer 625, and the first lens layer 620 can improve the horizontal-direction luminance. Also, the first lens layer 620 can adjust a refractive index of each of the first optical layer 623 and the first cover layer 625, thereby adjusting the amount of light emitted from the first lens layer 620 by units of light wavelengths. That is, the first lens layer 620 can use a characteristic where light has different refractive patterns by units of light wavelengths when passing through an interface between a high refractive layer and a low refractive layer, and thus, can increase the amount of light emitted in the horizontal direction, thereby improving an image based on a side viewing angle in the horizontal direction.

According to an embodiment, the first optical pattern 623 can be provided as a convex pattern in an upper surface of the first base layer 621. An upper surface of the first optical pattern 623 can have a cross-sectional structure having a curve shape such as an arch shape. Here, the shape and arrangement of the first optical pattern 623 can be modified based on a detailed configuration of the light control film 600, but the present disclosure is not limited thereto. Accordingly, the shape and arrangement of the first optical pattern 623 can be modified according to various embodiments, for controlling a path of light passing through the first lens layer 620.

In FIG. 22, the first optical pattern 623 can have a plurality of line shapes. For example, the line shapes of the first optical pattern 623 can have a certain height h and a certain bottom width L. Also, lower surfaces of the plurality of first optical patterns 623 can contact one another, but are not limited thereto and can be spaced apart from one another by a certain distance.

The first cover layer 625 can be disposed on the first optical pattern 623. In detail, the first cover layer 625 can cover the first optical pattern 623 to provide a flat surface on the first optical pattern 623. According to an embodiment, the first cover layer 625 can be formed of a material differing from that of the first optical pattern 623. In detail, the first cover layer 625 can be formed of a material having a refractive index which is higher than that of the first optical pattern 623, or can be formed of a material having a refractive index which is lower than that of the first optical pattern 623. For example, a refractive index difference between the first optical pattern 623 and the first cover layer 625 can be within a range of 0.02 to 0.2. For example, when the refractive index difference between the first optical pattern 623 and the first cover layer 625 is outside the range, an effect of solving a problem where a bluish image is displayed can be reduced.

The second lens layer 630 can be disposed under the first lens layer 620. For example, in a situation where the light control film 600 is disposed on the display panel 200, the second lens layer 630 can be disposed between the first lens layer 620 and the display panel 200. The second lens layer 630 can include a second base layer 631, a second optical pattern 633, and a second cover layer 635.

The second base layer 631 can support the second optical pattern 633. In detail, the second base layer 631 can be formed of the same material as that of the second optical pattern 633 and can provide a base where the second optical pattern 633 is provided. That is, a refractive index of the second optical pattern 633 can be the same as that of the second base layer 631, and a path of light passing through the second base layer 631 can be determined based on the refractive index, shape, and arrangement of the second optical pattern 633. For example, the second optical pattern 633 can be regularly arranged to form a plurality of matrixes on the second base layer 631, or can be irregularly arranged to have different pitches.

The second optical pattern 633 can be provided in plurality, and the plurality of second optical patterns 633 can be arranged along the second axis X differing from the first axis Y of the first base film 610. For example, the plurality of second optical patterns 633 can be arranged along the second axis X vertical to the first axis Y of the first base film 610. Here, the second axis X of the first base film 610 can correspond to a horizontal axis of the first base film 610 and can be parallel to a first horizontal direction. For example, the second optical pattern 633 can extend along the second axis X of the first base film 610. The second optical pattern 633 can be provided in plurality, and the plurality of second optical patterns 633 can be spaced apart from one another along the first axis Y vertical to the second axis X. As another example, the second optical patterns 633 can extend along the second axis X of the first base film 610 and can be disposed adjacent to one another along the first axis Y.

According to an embodiment, the second optical pattern 633 can be provided as a convex pattern in an upper surface of the second base layer 631. An upper surface of the second optical pattern 633 can have a cross-sectional structure having a curve shape such as an arch shape. Here, the shape and arrangement of the second optical patterns 633 can be modified based on a detailed configuration of the light control film 600, but the present disclosure is not limited thereto. Accordingly, the shape and arrangement of the second optical patterns 633 can be modified according to various embodiments, for controlling a path of light passing through the second lens layer 630. Also, a shape of the second optical pattern 633 can be the same as or different from that of the first optical pattern 623.

According to an embodiment, since the second optical pattern 633 extends along the second axis X of the first base film 610, the second lens layer 630 can improve vertical-direction luminance. Here, the vertical-direction luminance can be defined with respect to a viewer who is watching a screen of the display apparatus. That is, light incident on the second lens layer 630 can be refracted in a vertical direction in an interface between the second optical pattern 633 and the second cover layer 635, and the second lens layer 630 can improve the vertical-direction luminance. Also, the second lens layer 630 can adjust a refractive index of each of the second optical pattern 633 and the second cover layer 635, thereby adjusting the amount of light emitted from the second lens layer 630 by units of light wavelengths. That is, the second lens layer 630 can use a characteristic where light has different refractive patterns by units of light wavelengths when passing through an interface between a high refractive layer and a low refractive layer, and thus, can increase the amount of light emitted in the vertical direction, thereby improving an image based on a side viewing angle in the vertical direction.

The second cover layer 635 can be disposed on the second optical pattern 633. In detail, the second cover layer 635 can cover the second optical pattern 633 to provide a flat surface on the second optical pattern 633. According to an embodiment, the second cover layer 635 can be formed of a material differing from that of the second optical pattern 633. In detail, the second cover layer 635 can be formed of a material having a refractive index which is higher than that of the second optical pattern 633, or can be formed of a material having a refractive index which is lower than that of the second optical pattern 633. For example, a refractive index difference between the second optical pattern 633 and the second cover layer 635 can be within a range of 0.02 to 0.2. For example, when the refractive index difference between the second optical pattern 633 and the second cover layer 635 is outside the range, an effect of solving a problem where a bluish image is displayed can be reduced. As described above, since a refractive index difference between the first optical pattern 623 and the first cover layer 625 is within a range of 0.02 to 0.2 and a refractive index difference between the second optical pattern 633 and the second cover layer 635 is within a range of 0.02 to 0.2, the first and second lens layers 620 and 630 can solve a problem where an image becomes bluish.

As described above, since the first lens layer 620 for improving the horizontal-direction luminance and the second lens layer 630 for improving the vertical-direction luminance are disposed to overlap each other, the light control film 600 according to embodiments of the present disclosure can improve an image based on a side viewing angle in a plurality of directions and can solve a problem where a bluish image is displayed with respect to the side viewing angle in the plurality of directions. For example, a display apparatus which does not include the light control film 600 can have a problem where a bluish image is displayed with respect to the side viewing angle. Therefore, the light control film 600 including the first and second lens layers 620 and 630 can be coupled to the display panel to increase the amount of emitted long-wavelength light compared to short-wavelength light with respect to the side viewing angle in the plurality of directions and can control a bluish image occurring in the display panel 200 with respect to the side viewing angle, thereby finally displaying a high-quality image. Also, even when the light control film 600 according to embodiments of the present disclosure is disposed regardless of designing of a bias angle in the display panel 200 (or even when the bias angle is zero degrees), the luminance loss of light passing through the light control film 600 can be minimized.

The viewing angle controller 650 can be disposed on the other surface of the first base film 110 and can include a plurality of slits 653. In detail, the viewing angle controller 650 can include a light transmitting part 651 and a light absorbing part which are alternately disposed on a planar surface, and the light absorbing part can be disposed in each of the plurality of slits 653.

According to an embodiment, the light transmitting part 651 can be formed through a process of pressurizing a material layer by using the stamper after the material layer is coated on the other surface of the first base film 610. Here, the material layer can correspond to UV resin or photoresist. That is, the stamper can form the light transmitting part 651 and can simultaneously form the plurality of slits 653 corresponding to the light transmitting part 651. Therefore, the stamper can determine a shape of the plurality of slits 653 corresponding to the light transmitting part 651. Also, the light absorbing part can be formed by injecting a light absorbing material into the plurality of slits 133.

In FIG. 20, the plurality of slits 653 can be surrounded by the light transmitting part 651 and the adhesive layer 660 and can correspond to concave parts provided at certain intervals in the light transmitting part 651. According to an embodiment, the plurality of slits 653 can extend along the second axis X and can be spaced apart from one another along the first axis Y. That is, the plurality of slits 653 can extend in a direction parallel to the second optical pattern 633 of the second lens layer 630 and can extend in a direction vertical to the first optical pattern 623 of the first lens layer 620.

According to an embodiment, a distance between adjacent slits of the plurality of slits 653 can be 50 μm or less. In detail, when a distance between adjacent slits of the plurality of slits 653 is greater than 50 μm, side light emitted from the display panel may not be blocked by the plurality of slits 653. Therefore, when a distance between adjacent slits of the plurality of slits 653 spaced apart from one another along the first axis Y is 50 μm or less, the plurality of slits 653 can efficiently block the side light, thereby reinforcing security and decreasing a phase-shown phenomenon. Also, the viewing angle controller 650 can decrease the phase-shown phenomenon to secure outdoor visibility.

The light absorbing part can include a light absorbing material filled into each of the plurality of slits 653. In detail, when the light control film 600 is attached on the display panel 200, the light transmitting part 651 can transmit front light emitted from the display panel 200, and the light absorbing part can block (or absorb) the side light. For example, when the plurality of slits 653 extend along the second axis X and are spaced apart from one another along the first axis Y, the viewing angle controller 650 can transmit the front light and side light corresponding to a second axis direction and can block side light corresponding to a first axis direction.

Therefore, since the light control film 600 according to embodiments of the present disclosure includes the first and second lens layers 620 and 630 and the viewing angle controller 650, an image based on the side viewing angle in each of a plurality of directions can be improved by the first and second lens layers 620 and 630, and the viewing angle controller 650 can block side light corresponding to the first axis direction to decrease a phase-shown phenomenon.

In FIG. 20, the protective film 670 can be attached on the viewing angle controller 650 by the adhesive layer 660. For example, the protective film 670 can be formed of a transparent material and can protect the light control film 600 from an external impact.

The display panel 200 can include a display area AA and a non-display area NA. The display area AA can be an area which displays an image and can correspond to a center portion of the display panel 200. The non-display area NA can be an area which does not display an image and can correspond to an edge portion, surrounding the display area AA, of the display panel 200.

The display driving circuit unit 500 can include a plurality of circuit films 510, a plurality of driving ICs 530, a PCB 550, and a timing controller 570.

Figure 24:
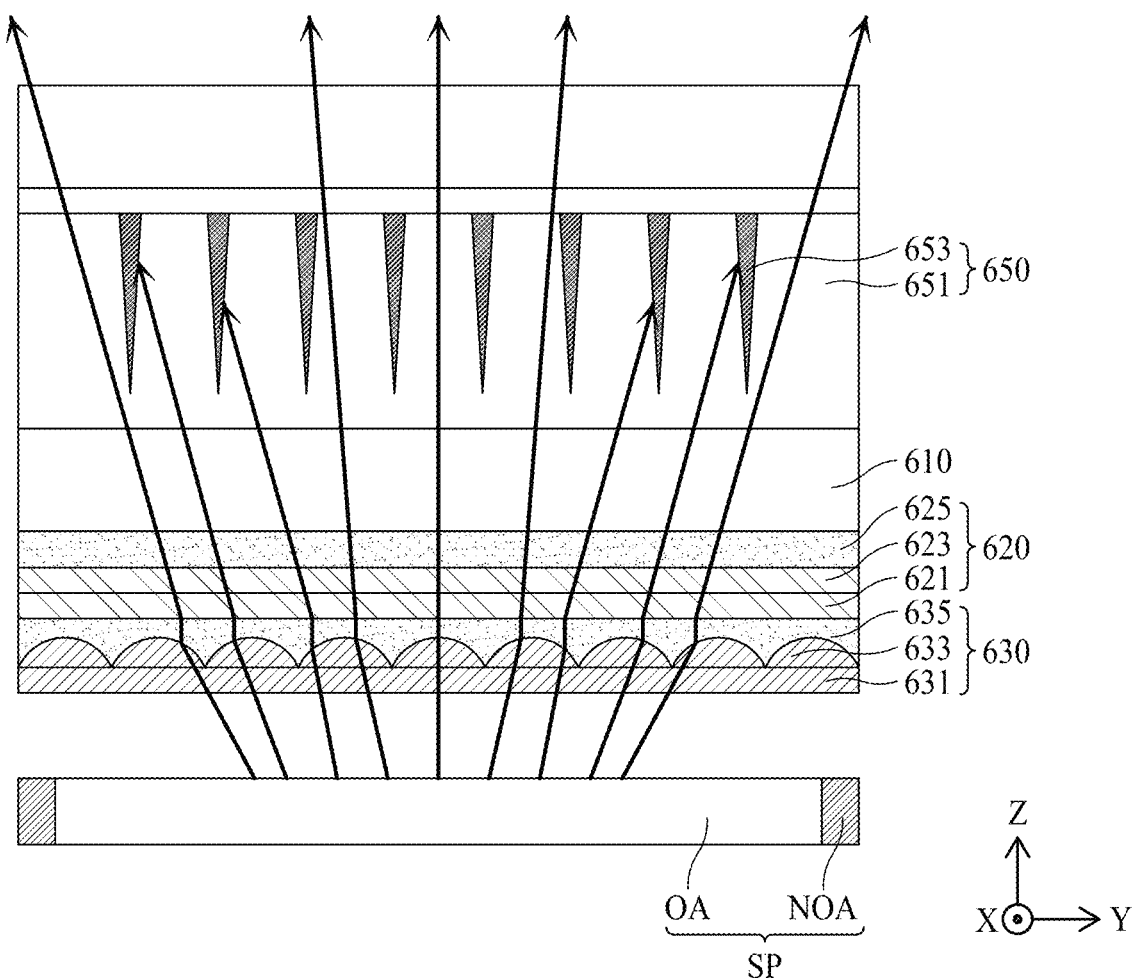
FIG. 24 is a diagram illustrating a path of light passing through a cross-sectional surface taken along line I-I' in an embodiment of the light control film illustrated in FIG. 19.
Figure 25:
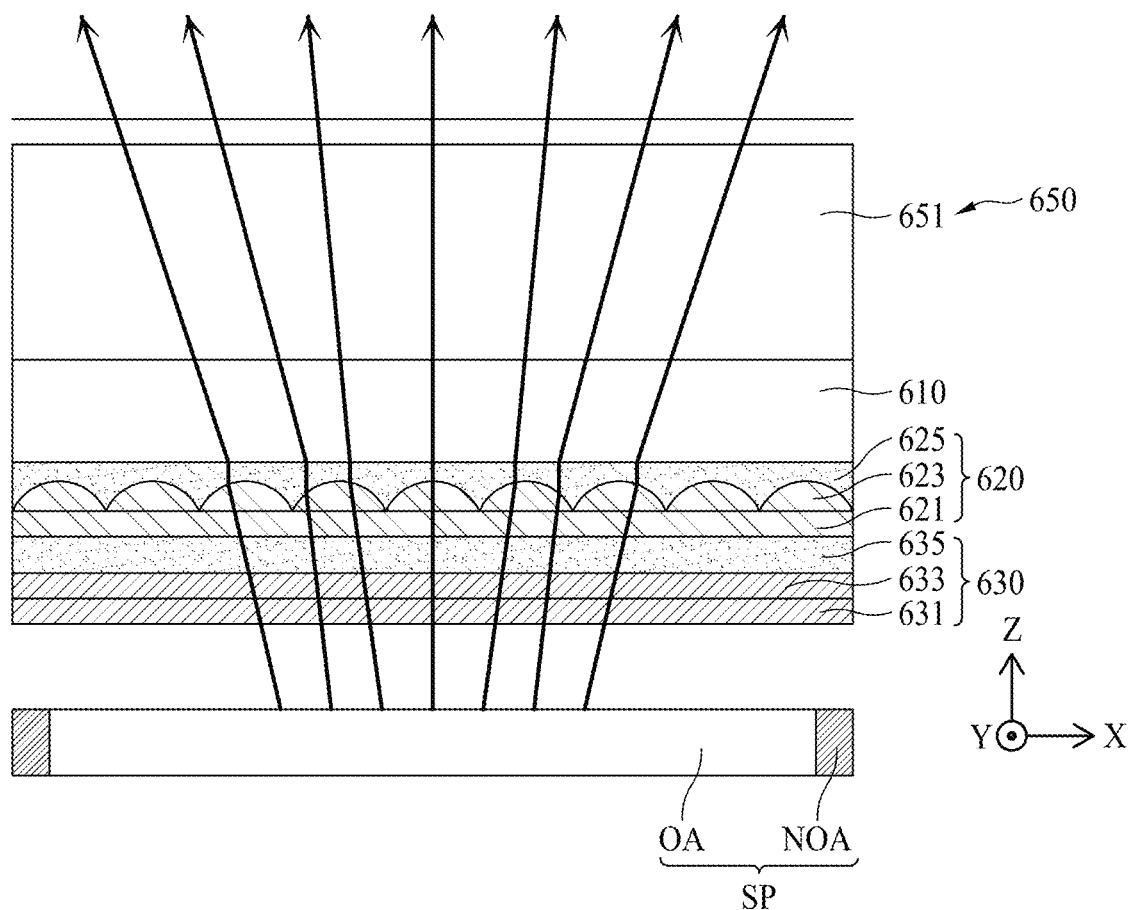
FIG. 25 is a diagram illustrating a path of light passing through a cross-sectional surface taken along line II-II' in an embodiment of the light control film illustrated in FIG. 19.

FIG. 24 is a diagram illustrating a path of light passing through a cross-sectional surface taken along line I-I' in the fifth embodiment of the light control film illustrated in FIG. 19, and FIG. 25 is a diagram illustrating a path of light passing through a cross-sectional surface taken along line II-II' in the fifth embodiment of the light control film illustrated in FIG. 19.

Referring to FIGS. 24 and 25, a light control film 600 can include a plurality of lens layers (for example, first and second lens layers) 620 and 630 disposed on one surface of a first base film 610 and a viewing angle controller 650 disposed on the other surface of the first base film 610.

According to an embodiment, light emitted from an opening area OA of a subpixel SP of the display panel 200 can be incident on the second lens layer 630. Also, a second optical pattern 633 of the second lens layer 630 can extend in a second axis direction X, and thus, the light incident on the second lens layer 630 can be refracted in a vertical direction in an interface between the second optical pattern 633 and the second cover layer 635. Therefore, the light incident on the second lens layer 630 can be output as visible light to an area corresponding to a non-opening area NOA which is adjacent to the opening area OA in a first axis direction Y. As a result, the second lens layer 630 can improve the vertical-direction luminance, and light emitted from the second lens layer 630 can be incident on the first lens layer 620.

According to an embodiment, light emitted from the second lens layer 630 can be incident on the first lens layer 620. Also, a first optical pattern 623 of the first lens layer 620 can extend in the first axis direction Y, and thus, the light incident on the first lens layer 620 can be refracted in a horizontal direction in an interface between the first optical pattern 623 and the first cover layer 625. Therefore, the light incident on the first lens layer 620 can be output as visible light to an area corresponding to a non-opening area NOA which is adjacent to the opening area OA in the second axis direction X. As a result, the first lens layer 620 can improve the horizontal-direction luminance, and light emitted from the first lens layer 620 can be incident on the viewing angle controller 650.

As described above, since the light control film 600 includes the first and second lens layers 620 and 630, the light control film 600 can decrease lattice sensitivity where areas corresponding to non-opening areas NOA adjacent to the opening area OA in the first axis direction Y and the second axis direction X are connected to one another and are recognized as a lattice form and can maintain a sharp image. In other words, the light control film 600 according to embodiments of the present disclosure can improve an image based on a side viewing angle in each of a horizontal direction and a vertical direction.

Furthermore, the viewing angle controller 650 can be disposed to overlap the first and second lens layers 620 and 630, and light output from each of the first and second lens layers 620 and 630 can be incident on the viewing angle controller 650. In this situation, the viewing angle controller 650 can include a plurality of slits 653 which extend in the second axis direction X and are spaced apart from one another in the first axis direction Y, and a light absorbing part can be disposed in each of the plurality of slits 653. The light absorbing part can transmit side light which is output in the second axis direction X and can block side light which is output in the first axis direction Y.

Therefore, the first and second lens layers 620 and 630 can improve an image based on a side viewing angle in each of the first axis direction Y and the second axis direction X, and the viewing angle controller 650 can block side light in the second direction Y, thereby preventing a bluish image from being displayed with respect to the side viewing angle in each of the first axis direction Y and the second axis direction X, reinforcing security in the second direction Y, and decreasing a phase-shown phenomenon.

Figure 26:
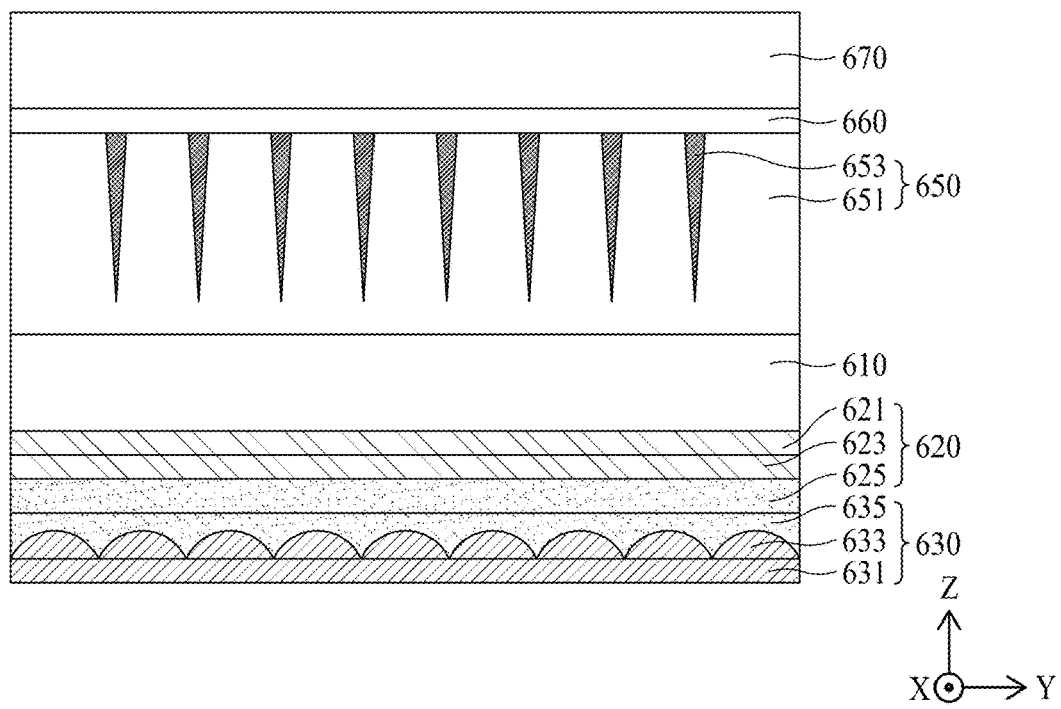
FIG. 26 is a cross-sectional view taken along line I-I' in another embodiment of a light control film illustrated in FIG. 19.
Figure 27:
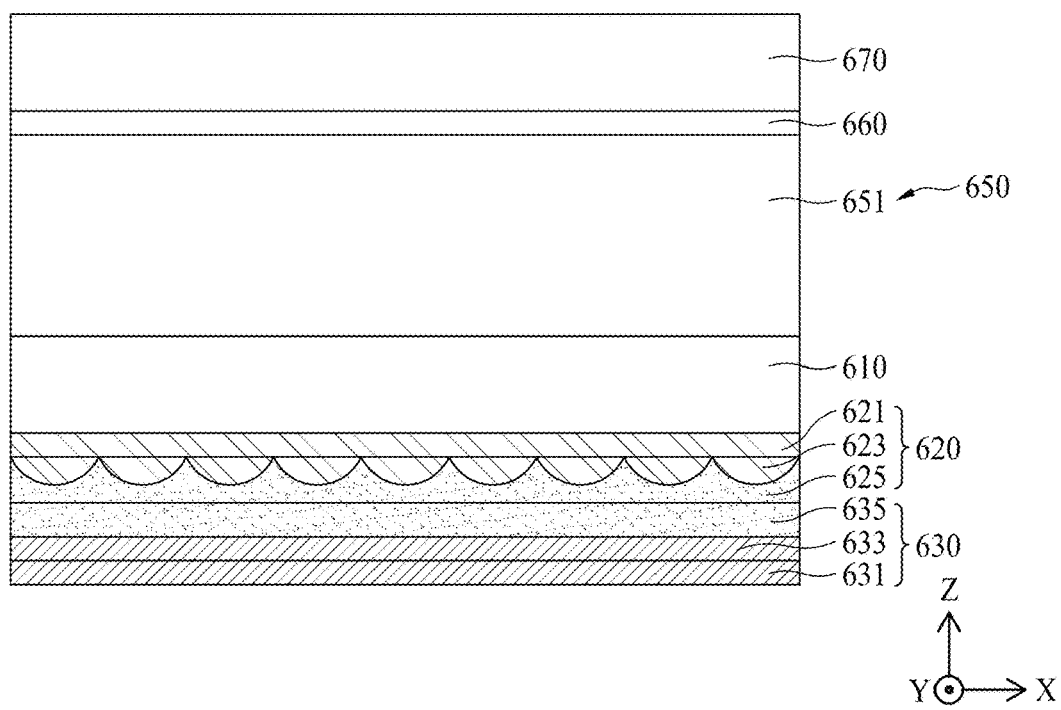
FIG. 27 is a cross-sectional view taken along line II-II' in an embodiment of the light control film illustrated in FIG. 19.

FIG. 26 is a cross-sectional view taken along line I-I' in a sixth embodiment of a light control film illustrated in FIG. 19, and FIG. 27 is a cross-sectional view taken along line II-II' in the sixth embodiment of the light control film illustrated in FIG. 19. Except for that a configuration of a first lens layer 620 is modified, the light control film of each of FIGS. 26 and 27 is substantially the same as the light control film of each of FIGS. 20 to 25, and thus, descriptions of the same elements as the above-described elements will be briefly given below or are omitted.

Referring to FIGS. 26 and 27, a light control film 600 according to a sixth embodiment can correspond to a structure where the first lens layer 620 of the light control film 600 according to the fifth embodiment is reversed with respect to an upper portion and a lower portion thereof.

The light control film 600 can include a first base film 610, first and second lens layers 620 and 630, a viewing angle controller 650, an adhesive layer 660, and a protective film 670.

The first lens layer 620 can be disposed on one surface of the first base film 610 and can include a first base layer 621, a first optical pattern 623, and a first cover layer 625.

The first base layer 621 can support the first optical pattern 623. In detail, the first base layer 621 can be formed of the same material as that of the first optical pattern 623 and can provide a base where the first optical pattern 623 is provided.

According to an embodiment, the first base layer 621 can be provided on the one surface of the first base film 610, and the first optical pattern 623 can be provided as convex patterns in one surface of the first base layer 621. Also, the first cover layer 625 cover one surface of the first optical pattern 623 to provide a flat surface on the one surface of the first optical pattern 623. Accordingly, the first base layer 621, the first optical pattern 623, and the first cover layer 625 can be sequentially formed from the one surface of the first base film 110.

As described above, since the first lens layer 620 includes the first base layer 621, the first optical pattern 623, and the first cover layer 625 formed sequentially from the one surface of the first base film 110, the first lens layer 620 can refract light, which is incident thereon from the second lens layer 630, in a horizontal direction in an interface between the first optical pattern 623 and the first cover layer 625 and can improve the horizontal-direction luminance.

The second lens layer 630 can be disposed on one surface of the first lens layer 620 and can include a second base layer 631, a second optical pattern 633, and a second cover layer 635.

The second base layer 631 can support the second optical pattern 633. In detail, the second base layer 631 can be formed of the same material as that of the second optical pattern 633 and can provide a base where the second optical pattern 633 is provided.

The second cover layer 635 can be disposed on the second optical pattern 633. In detail, the second cover layer 635 can cover the second optical pattern 633 to provide a flat surface on the second optical pattern 633.

According to an embodiment, the second cover layer 635 can be disposed on one surface of the first cover layer 625. That is, the first cover layer 625 covering the first optical pattern 623 can contact the second cover layer 635 covering the second optical pattern 633. For example, the second cover layer 635 can be formed through a process of pressurizing a material layer by using the stamper after the material layer is coated on one surface of the first cover layer 625. For example, the second cover layer 635 can be engraved and patterned to correspond to a shape of the second optical pattern 633. Here, the material layer can correspond to UV resin or photoresist. That is, the stamper can engrave and pattern the second cover layer 635 to determine a shape of the second optical pattern 633 corresponding to the second cover layer 635.

As described above, since the second lens layer 630 includes the second cover layer 635, the second optical pattern 633, and the second base layer 631 formed sequentially from the one surface of the first lens layer 620, the second lens layer 630 can refract light, which is incident thereon from the display panel 200, in a vertical direction in an interface between the second optical pattern 633 and the second cover layer 635 and can improve the vertical-direction luminance.

Therefore, the first and second lens layers 620 and 630 can improve an image based on a side viewing angle in each of the first axis direction Y and the second axis direction X and can prevent a bluish image from being displayed with respect to the side viewing angle in each of the first axis direction Y and the second axis direction X.

Figure 28:
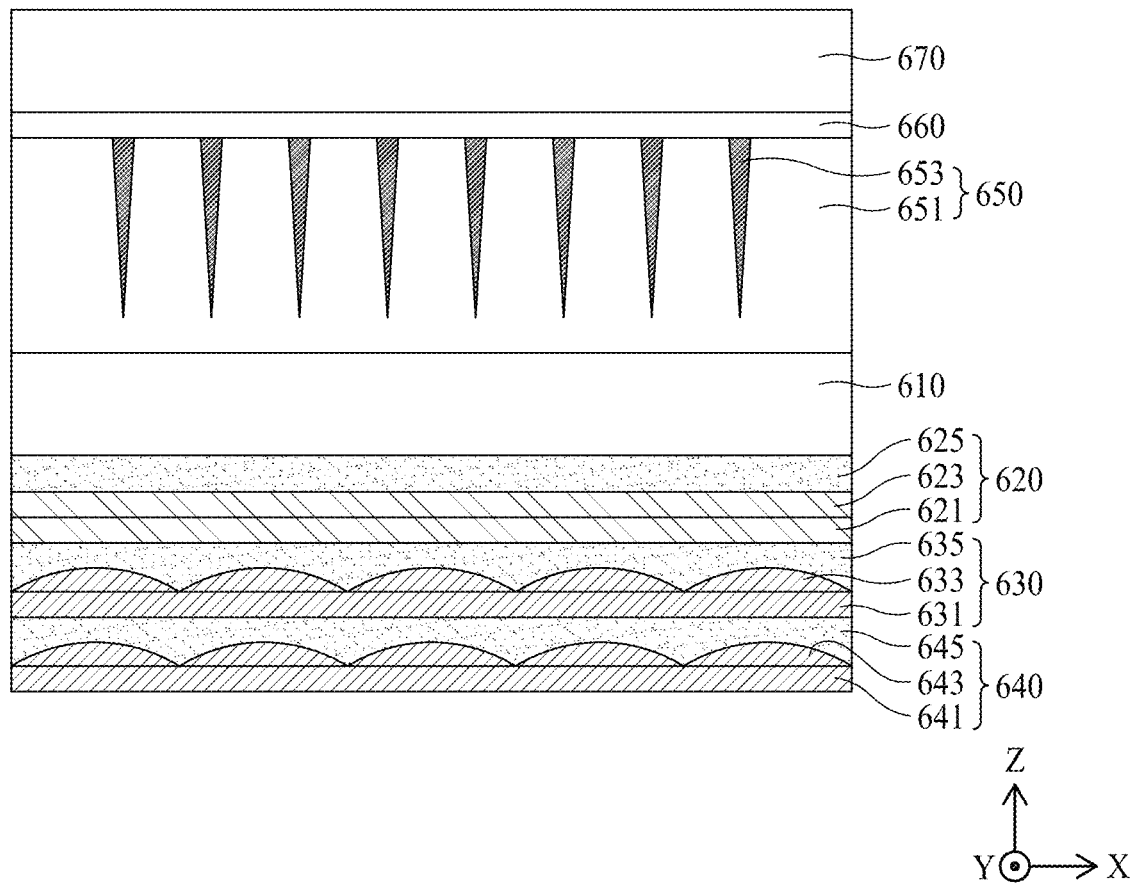
FIG. 28 is a cross-sectional view taken along line I-I' in another embodiment of a light control film illustrated in FIG. 19.
Figure 29:
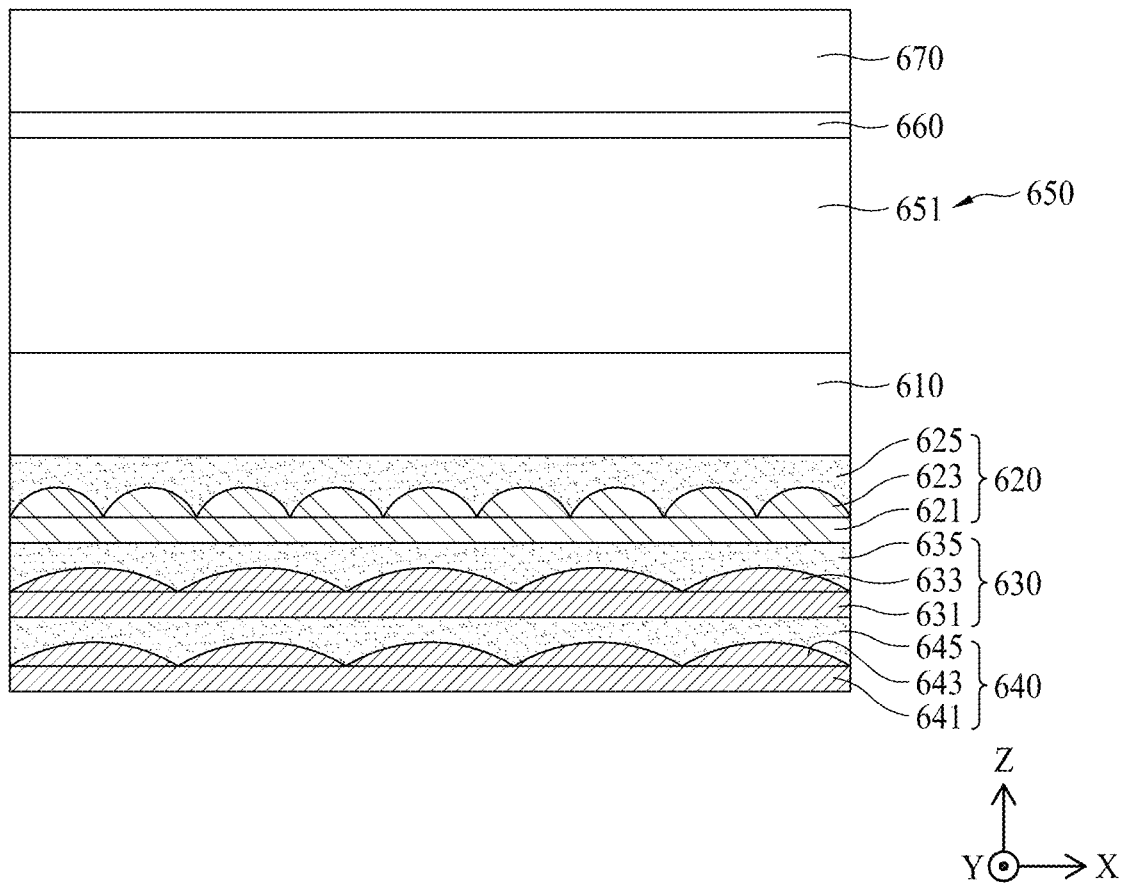
FIG. 29 is a cross-sectional view taken along line II-II' in an embodiment of the light control film illustrated in FIG. 19.
Figure 30:
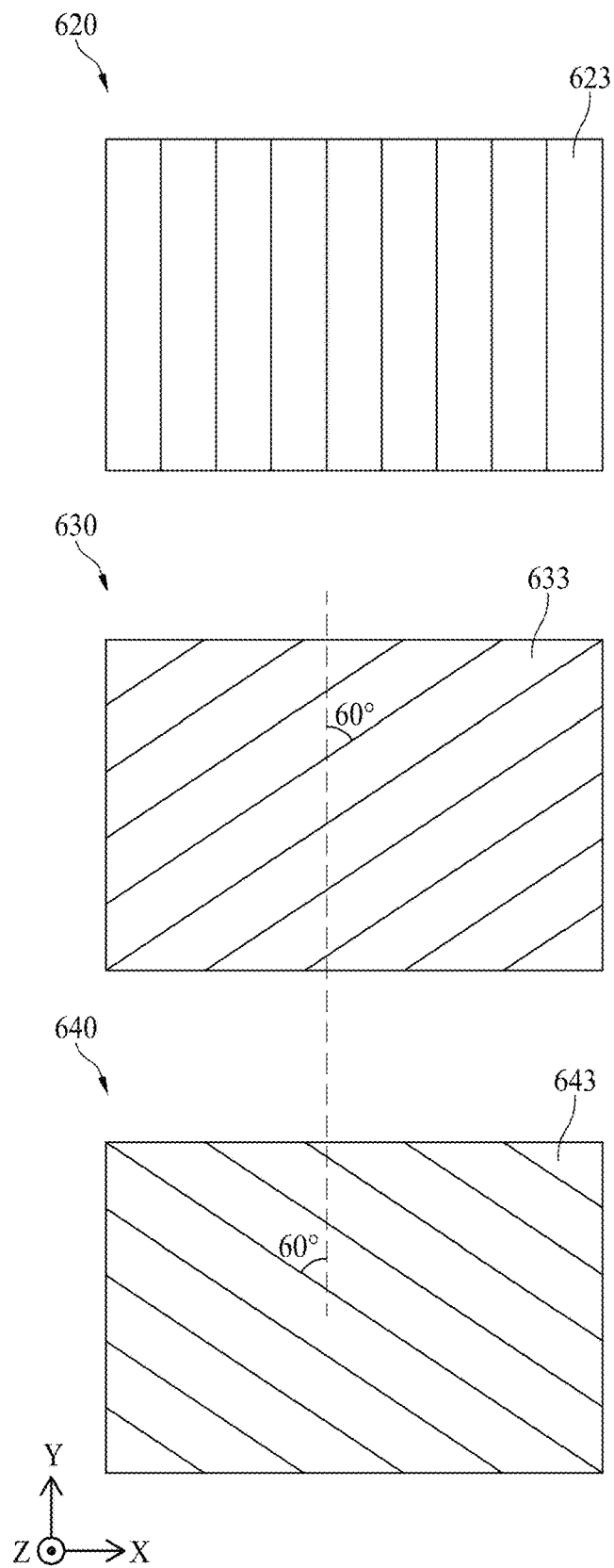
FIG. 30 is a plan view illustrating first to third lens layers in another embodiment of the light control film illustrated in FIG. 19.

FIG. 28 is a cross-sectional view taken along line I-I' in a seventh embodiment of a light control film illustrated in FIG. 19, FIG. 29 is a cross-sectional view taken along line II-II' in the seventh embodiment of the light control film illustrated in FIG. 19, and FIG. 30 is a plan view illustrating first to third lens layers in the seventh embodiment of the light control film illustrated in FIG. 19. Except for that a third lens layer 640 is further provided, the light control film of each of FIGS. 28 to 30 is substantially the same as the light control film of each of FIGS. 20 to 25, and thus, descriptions of the same elements as the above-described elements will be briefly given below or are omitted.

Referring to FIGS. 28 to 30, a plurality of lens parts can be disposed on one surface of a first base film 610 and can include a first lens layer 620, a second lens layer 630, and a third lens layer 640.

The first lens layer 620 can be disposed between the first base film 610 and the second lens layer 630. The first lens layer 620 and can include a first base layer 621, a first optical pattern 623, and a first cover layer 625.

The first base layer 621 can support the first optical pattern 623. In detail, the first base layer 621 can be formed of the same material as that of the first optical pattern 623 and can provide a base where the first optical pattern 623 is provided.

The first optical pattern 623 can be provided in plurality, and the plurality of first optical patterns 623 can be arranged along a first axis Y of the first base film 610. Here, the first axis Y of the first base film 610 can correspond to a vertical axis of the first base film 610. According to an embodiment, since the first optical pattern 623 extends along the first axis Y of the first base film 610, the first lens layer 620 can improve the horizontal-direction luminance. That is, light incident on the first lens layer 620 can be refracted in a horizontal direction in an interface between the first optical pattern 623 and the first cover layer 625, and the first lens layer 620 can improve the horizontal-direction luminance. That is, the first lens layer 620 can use a characteristic where light has different refractive patterns by units of light wavelengths when passing through an interface between a high refractive layer and a low refractive layer, and thus, can increase the amount of light emitted in the horizontal direction, thereby improving an image based on a side viewing angle in the horizontal direction.

The first cover layer 625 can be disposed on the first optical pattern 623. In detail, the first cover layer 625 can cover the first optical pattern 623 to provide a flat surface on the first optical pattern 623.

The second lens layer 630 can be disposed between the first lens layer 620 and the third lens layer 640. The second lens layer 630 can include a second base layer 631, a second optical pattern 633, and a second cover layer 635.

The second base layer 631 can support the second optical pattern 633. In detail, the second base layer 631 can be formed of the same material as that of the second optical pattern 633 and can provide a base where the second optical pattern 633 is provided.

In FIG. 30, the second optical pattern 633 can be provided in plurality, and the plurality of second optical patterns 633 can be arranged along a third axis differing from the first axis Y of the first optical pattern 623. For example, the third axis of the second optical pattern 633 can extend from a right upper end to a left lower end of the first base film 610 (e.g., the third axis can be diagonal). Also, an angle between the third axis of the second optical pattern 633 and the first axis Y of the first optical pattern 623 can correspond to 60 degrees. Also, the third axis of the second optical pattern 633 and a fourth axis of the third optical pattern 643 can be symmetrical with each other with respect to a vertical axis of the first base film 610. Therefore, the second optical pattern 633 can extend along the third axis of the second optical pattern 633, and thus, the second lens layer 630 can improve luminance in a direction toward each of the right lower end and the left upper end. That is, light incident on the second lens layer 630 can be refracted in a horizontal direction in an interface between the second optical pattern 633 and the second cover layer 635, and the second lens layer 630 can improve an image based on a side viewing angle in a direction toward each of the right lower end and the left upper end.

The second cover layer 635 can be disposed on the second optical pattern 633. In detail, the second cover layer 635 can cover the second optical pattern 633 to provide a flat surface on the second optical pattern 633.

The third lens layer 640 can be disposed under the second lens layer 630. For example, in a situation where the light control film 600 is disposed on the display panel 200, the third lens layer 640 can be disposed between the second lens layer 630 and the display panel 200. The third lens layer 640 can include a third base layer 641, a third optical pattern 643, and a third cover layer 645.

The third base layer 641 can support the third optical pattern 643. In detail, the third base layer 641 can be formed of the same material as that of the third optical pattern 643 and can provide a base where the third optical pattern 643 is provided.

In FIG. 30, the third optical pattern 643 can be provided in plurality, and the plurality of third optical patterns 643 can be arranged along the first axis Y of the first optical pattern 623 and a fourth axis differing from the third axis of the second optical pattern 633. For example, the fourth axis of the third optical pattern 643 can extend from a left upper end to a right lower end of the first base film 610. Also, an angle between the fourth axis of the third optical pattern 643 and the first axis Y of the first optical pattern 623 can correspond to 60 degrees. Also, the fourth axis of the third optical pattern 643 and the third axis of the second optical pattern 633 can be symmetrical with each other with respect to the vertical axis of the first base film 610. Therefore, the third optical pattern 643 can extend along the fourth axis of the first base film 610, and thus, the third lens layer 640 can improve luminance in a direction toward each of the left lower end and the right upper end. That is, light incident on the third lens layer 640 can be refracted in a horizontal direction in an interface between the third optical pattern 643 and the third cover layer 645, and the third lens layer 640 can improve an image based on a side viewing angle in a direction toward each of the left lower end and the right upper end.

The third cover layer 645 can be disposed on the third optical pattern 643. In detail, the third cover layer 645 can cover the third optical pattern 643 to provide a flat surface on the third optical pattern 643.

As described above, since the first lens layer 620 for improving the horizontal-direction luminance, the second lens layer 630 for improving luminance in a direction toward each of the right lower end and the left upper end, and the third lens layer 640 for improving luminance in a direction toward each of the left lower end and the right upper end are disposed to overlap each other, the light control film 600 according to embodiments of the present disclosure can improve an image based on a side viewing angle in a plurality of directions and can solve a problem where a bluish image is displayed with respect to the side viewing angle in the plurality of directions. For example, a display apparatus which does not include the light control film 600 may have a problem where a bluish image is displayed with respect to the side viewing angle. Therefore, the light control film 600 including the first to third lens layers 620 to 640 can be coupled to the display panel to increase the amount of emitted long-wavelength light compared to short-wavelength light with respect to the side viewing angle in the plurality of directions and can control a bluish image occurring in the display panel 200 with respect to the side viewing angle, thereby finally displaying a high-quality image. Also, even when the light control film 600 according to embodiments of the present disclosure is disposed regardless of designing of a bias angle in the display panel 200 (or even when the bias angle is zero degrees), the luminance loss of light passing through the light control film 600 can be minimized.

Figure 31:
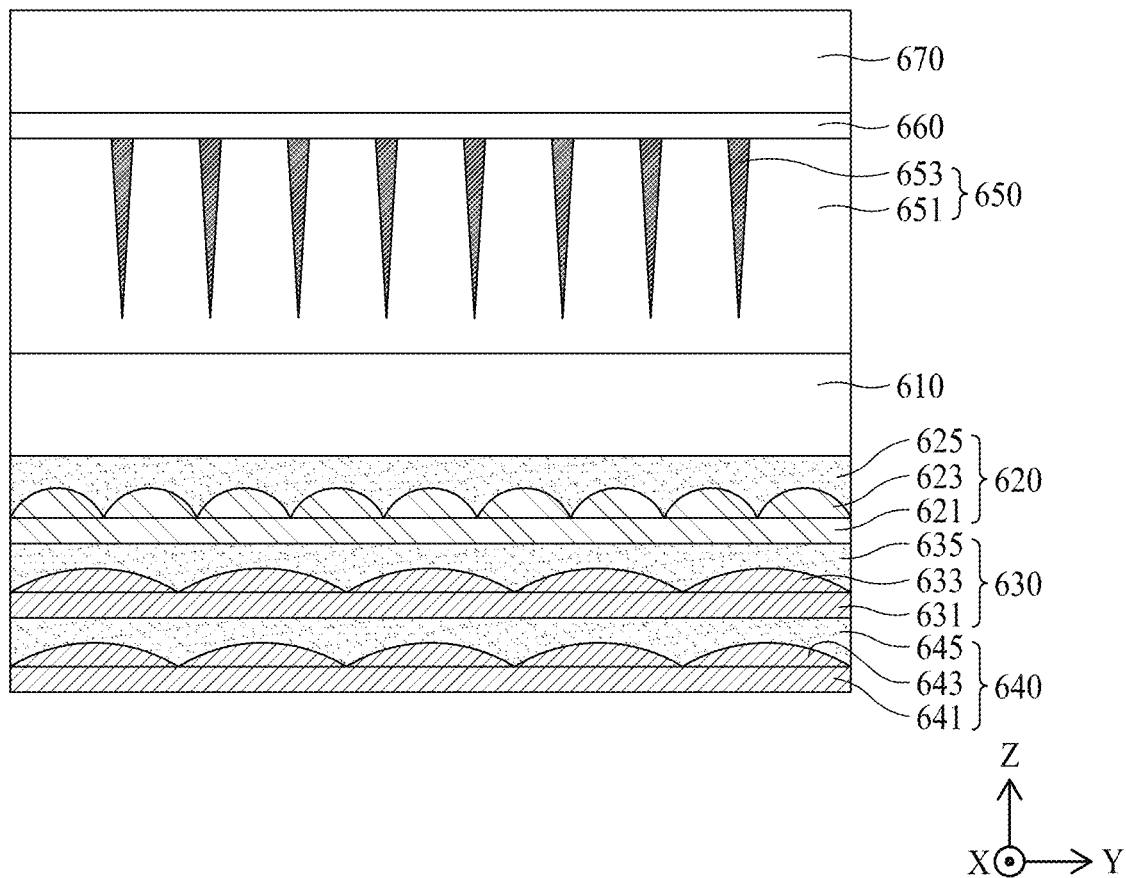
FIG. 31 is a cross-sectional view taken along line I-I' in another embodiment of a light control film illustrated in FIG. 19.
Figure 32:
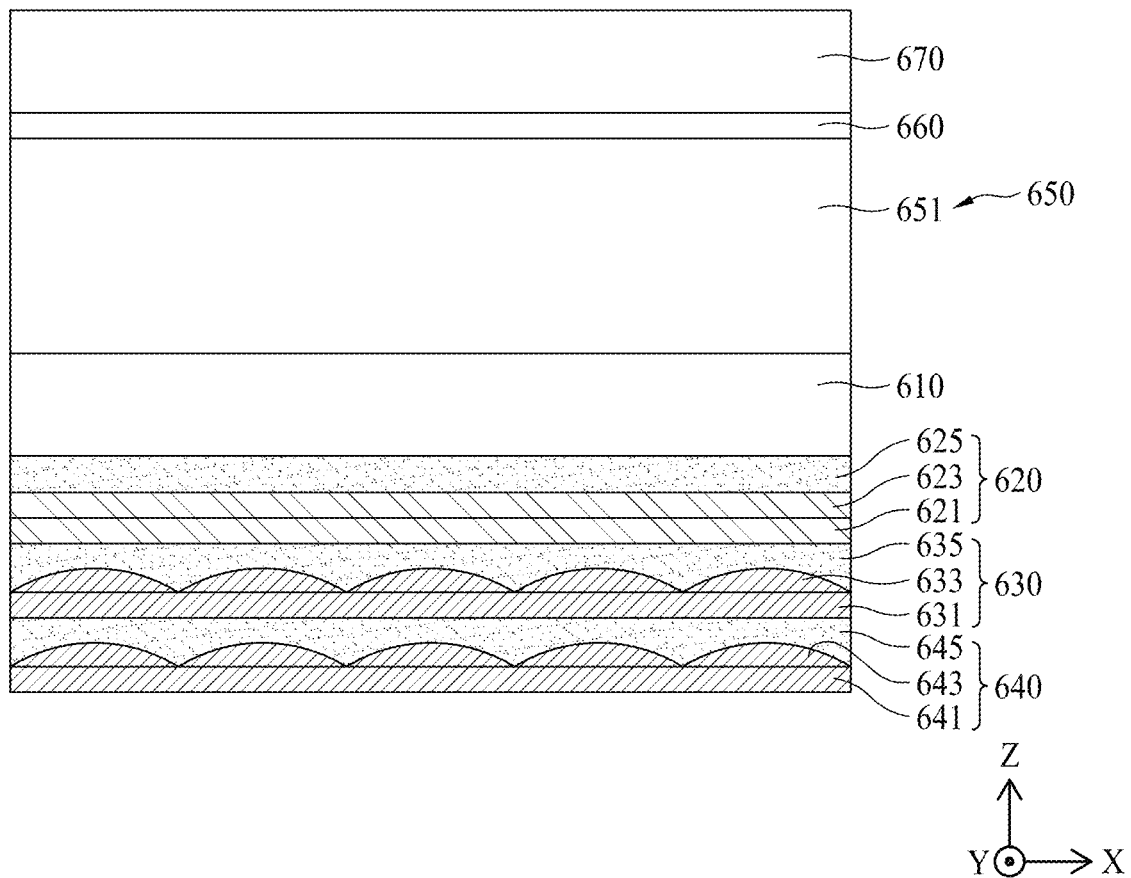
FIG. 32 is a cross-sectional view taken along line II-II' in an embodiment of the light control film illustrated in FIG. 19.
Figure 33:
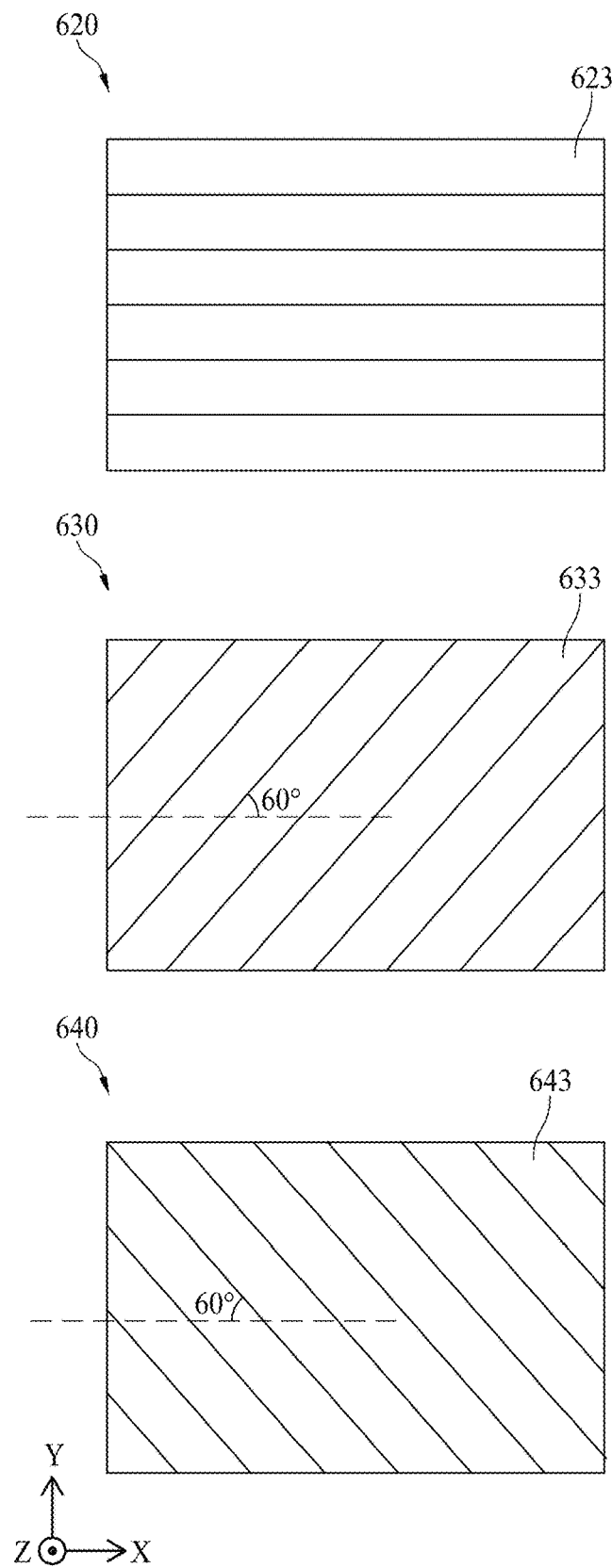
FIG. 33 is a plan view illustrating first to third lens layers in an embodiment of the light control film illustrated in FIG. 19.

FIG. 31 is a cross-sectional view taken along line I-I' in an eighth embodiment of a light control film illustrated in FIG. 19, FIG. 32 is a cross-sectional view taken along line II-II' in the eighth embodiment of the light control film illustrated in FIG. 19, and FIG. 33 is a plan view illustrating first to third lens layers in the eighth embodiment of the light control film illustrated in FIG. 19. Except for that the arrangement of first to third optical patterns 623, 633, and 643 is modified, the light control film of each of FIGS. 31 to 33 is substantially the same as the light control film of each of FIGS. 28 to 30, and thus, descriptions of the same elements as the above-described elements will be briefly given below or are omitted.

Referring to FIGS. 31 to 33, a lens part can be disposed on one surface of a first base film 610 and can include a first lens layer 620, a second lens layer 630, and a third lens layer 640. The first lens layer 620 can be disposed between the first base film 610 and the second lens layer 630.

The first optical pattern 623 can be provided in plurality, and the plurality of first optical patterns 623 can be arranged along a second axis X of the first base film 610. Here, the second axis X of the first base film 610 can correspond to a horizontal axis of the first base film 610. According to an embodiment, since the first optical pattern 623 extends along the second axis X of the first base film 610, the first lens layer 620 can improve the vertical-direction luminance. That is, light incident on the first lens layer 620 can be refracted in a vertical direction in an interface between the first optical pattern 623 and the first cover layer 625, and the first lens layer 620 can improve the vertical-direction luminance. That is, the first lens layer 620 can use a characteristic where light has different refractive patterns by units of light wavelengths when passing through an interface between a high refractive layer and a low refractive layer, and thus, can increase the amount of light emitted in the vertical direction, thereby improving an image based on a side viewing angle in the vertical direction.

In FIG. 33, the second optical pattern 633 can be provided in plurality, and the plurality of second optical patterns 633 can be arranged along a fifth axis differing from the second axis X of the first optical pattern 623. For example, the fifth axis of the second optical pattern 633 can extend from a right upper end to a left lower end of the first base film 610. Also, an angle between the fifth axis of the second optical pattern 633 and the second axis X of the first optical pattern 623 can correspond to 60 degrees. Also, the fifth axis of the second optical pattern 633 and a sixth axis of the third optical pattern 643 can be symmetrical with each other with respect to a horizontal axis of the first base film 610. Therefore, the second optical pattern 633 can extend along the fifth axis of the first base film 610, and thus, the second lens layer 630 can improve luminance in a direction toward each of the right lower end and the left upper end. That is, light incident on the second lens layer 630 can be refracted in a direction toward each of the right lower end and the left upper end in an interface between the second optical pattern 633 and the second cover layer 635, and the second lens layer 630 can improve an image based on a side viewing angle in a direction toward each of the right lower end and the left upper end.

In FIG. 33, the third optical pattern 643 can be provided in plurality, and the plurality of third optical patterns 643 can be arranged along the second axis X of the first optical pattern 623 and a sixth axis differing from the fifth axis of the second optical pattern 633. For example, the sixth axis of the third optical pattern 643 can extend from a left upper end to a right lower end of the first base film 610. Also, an angle between the sixth axis of the third optical pattern 643 and the second axis X of the first optical pattern 623 can correspond to 60 degrees. Also, the sixth axis of the third optical pattern 643 and the fifth axis of the second optical pattern 633 can be symmetrical with each other with respect to the horizontal axis of the first base film 610. Therefore, the third optical pattern 643 can extend along the sixth axis of the first base film 610, and thus, the third lens layer 640 can improve luminance in a direction toward each of the left lower end and the right upper end. That is, light incident on the third lens layer 640 can be refracted in a horizontal direction in an interface between the third optical pattern 643 and the second cover layer 635, and the third lens layer 640 can improve an image based on a side viewing angle in a direction toward each of the left lower end and the right upper end.

As described above, since the first lens layer 620 for improving the vertical-direction luminance, the second lens layer 630 for improving luminance in a direction toward each of the right lower end and the left upper end, and the third lens layer 640 for improving luminance in a direction toward each of the left lower end and the right upper end are disposed to overlap each other, the light control film 600 according to embodiments of the present disclosure can improve an image based on a side viewing angle in a plurality of directions and can solve a problem where a bluish image is displayed with respect to the side viewing angle in the plurality of directions. For example, a display apparatus which does not include the light control film 600 may have a problem where a bluish image is displayed with respect to the side viewing angle. Therefore, the light control film 600 including the first to third lens layers 620 to 640 can be coupled to the display panel to increase the amount of emitted long-wavelength light compared to short-wavelength light with respect to the side viewing angle in the plurality of directions and can control a bluish image occurring in the display panel 200 with respect to the side viewing angle, thereby finally displaying a high-quality image. Also, even when the light control film 600 according to embodiments of the present disclosure is disposed regardless of designing of a bias angle in the display panel 200 (or even when the bias angle is zero degrees), the luminance loss of light passing through the light control film 600 can be minimized.

Figure 34:
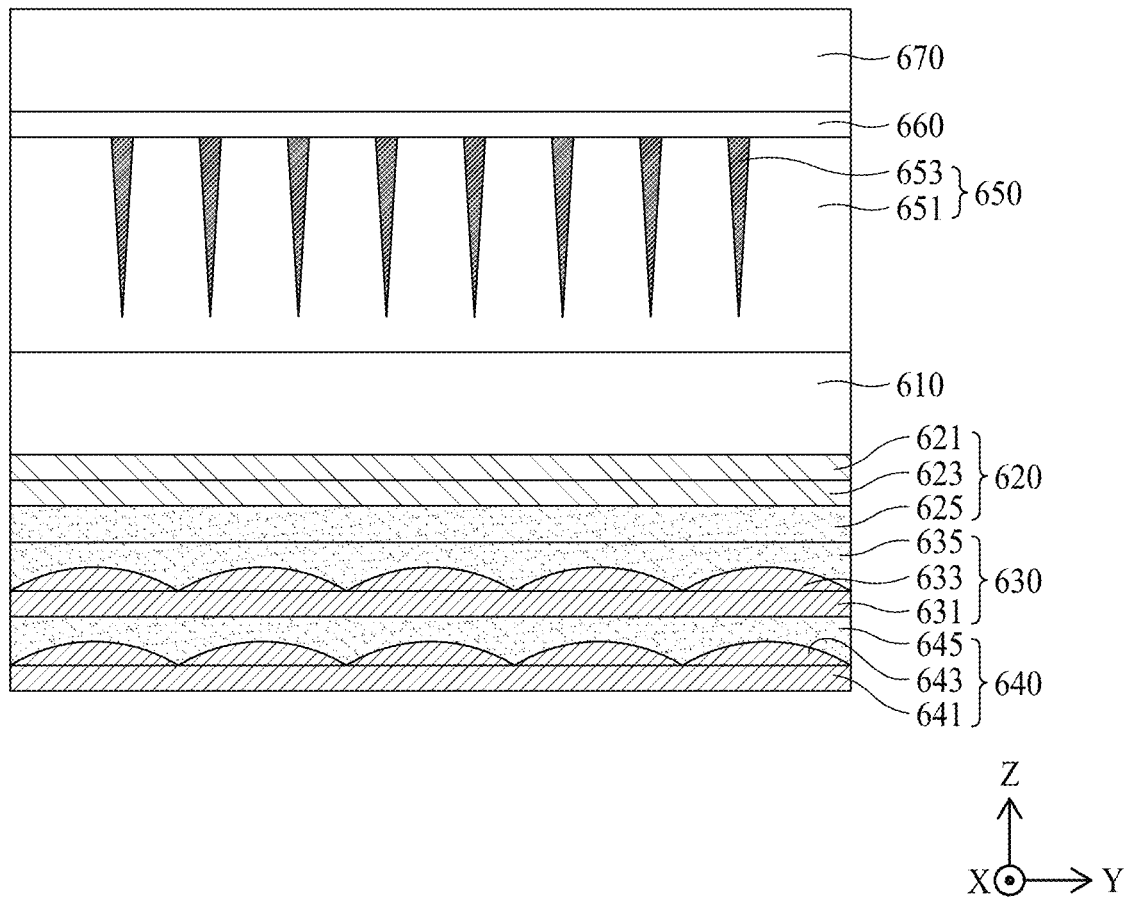
FIG. 34 is a cross-sectional view taken along line I-I' in another of a light control film illustrated in FIG. 19.
Figure 35:
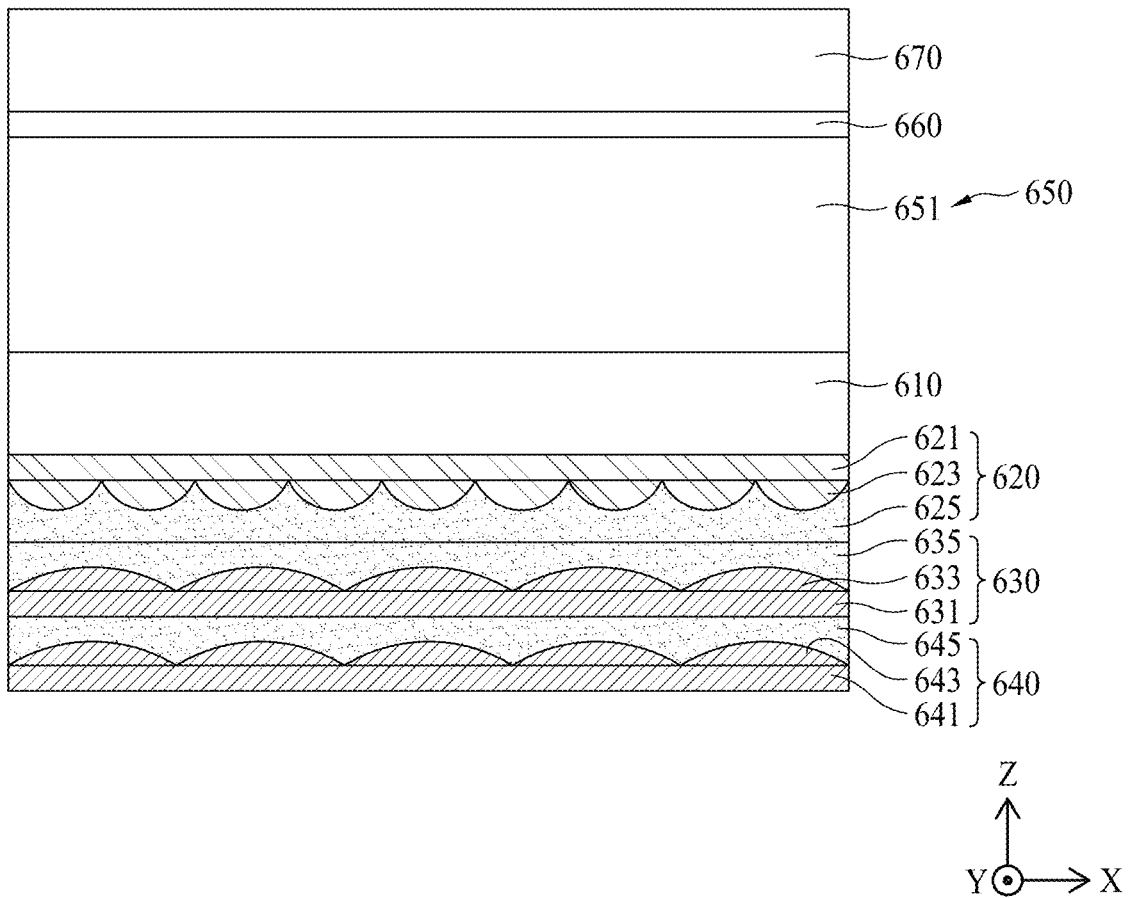
FIG. 35 is a cross-sectional view taken along line II-II' in an embodiment of the light control film illustrated in FIG. 19.

FIG. 34 is a cross-sectional view taken along line I-I' in a ninth embodiment of a light control film illustrated in FIG. 19, and FIG. 35 is a cross-sectional view taken along line II-II' in the ninth embodiment of the light control film illustrated in FIG. 19. Except for that a configuration of a first lens layer 620 is modified, the light control film of each of FIGS. 34 and 35 is substantially the same as the light control film of each of FIGS. 28 to 30, and thus, descriptions of the same elements as the above-described elements will be briefly given below or are omitted.

Referring to FIGS. 34 and 35, a light control film 600 according to a ninth embodiment can correspond to a structure where the first lens layer 620 of the light control film 600 according to the seventh embodiment is reversed with respect to an upper portion and a lower portion thereof.

The light control film 600 can include a first base film 610, first to third lens layers 620 to 640, a viewing angle controller 650, an adhesive layer 660, and a protective film 670.

The first lens layer 620 can be disposed on one surface of the first base film 610 and can include a first base layer 621, a first optical pattern 623, and a first cover layer 625.

The first base layer 621 can support the first optical pattern 623. In detail, the first base layer 621 can be formed of the same material as that of the first optical pattern 623 and can provide a base where the first optical pattern 623 is provided.

According to an embodiment, the first base layer 621 can be provided on the one surface of the first base film 610, and the first optical pattern 623 can be provided as convex patterns in one surface of the first base layer 621. Also, the first cover layer 625 cover one surface of the first optical pattern 623 to provide a flat surface on the one surface of the first optical pattern 623. Accordingly, the first base layer 621, the first optical pattern 623, and the first cover layer 625 can be formed sequentially from the one surface of the first base film 110.

As described above, since the first lens layer 620 includes the first base layer 621, the first optical pattern 623, and the first cover layer 625 formed sequentially from the one surface of the first base film 110, the first lens layer 620 can refract light, which is incident thereon from the second lens layer 630, in a horizontal direction in an interface between the first optical pattern 623 and the first cover layer 625 and can improve the horizontal-direction luminance.

The second lens layer 630 can be disposed on one surface of the first lens layer 620 and can include a second base layer 631, a second optical pattern 633, and a second cover layer 635.

The second base layer 631 can support the second optical pattern 633. In detail, the second base layer 631 can be formed of the same material as that of the second optical pattern 633 and can provide a base where the second optical pattern 633 is provided.

The second cover layer 635 can be disposed on the second optical pattern 633. In detail, the second cover layer 635 can cover the second optical pattern 633 to provide a flat surface on the second optical pattern 633.

According to an embodiment, the second cover layer 635 can be disposed on one surface of the first cover layer 625. That is, the first cover layer 625 covering the first optical pattern 623 can contact the second cover layer 635 covering the second optical pattern 633. For example, the second cover layer 635 can be formed through a process of pressurizing a material layer by using the stamper after the material layer is coated on one surface of the first cover layer 625. For example, the second cover layer 635 can be engraved and patterned to correspond to a shape of the second optical pattern 633. Here, the material layer can correspond to UV resin or photoresist. That is, the stamper can engrave and pattern the second cover layer 635 to determine a shape of the second optical pattern 633 corresponding to the second cover layer 635.

As described above, since the second lens layer 630 includes the second cover layer 635, the second optical pattern 633, and the second base layer 631 formed sequentially from the one surface of the first lens layer 620, the second lens layer 630 can refract light, which is incident thereon from the display panel 200, in a vertical direction in an interface between the second optical pattern 633 and the second cover layer 635 and can improve the vertical-direction luminance.

The third lens layer 640 can be disposed under the second lens layer 630. For example, in a situation where the light control film 600 is disposed on the display panel 200, the third lens layer 640 can be disposed between the second lens layer 630 and the display panel 200. The third lens layer 640 can include a third base layer 641, a third optical pattern 643, and a third cover layer 645.

As described above, since the first lens layer 620 for improving the horizontal-direction luminance, the second lens layer 630 for improving luminance in a direction toward each of the right lower end and the left upper end, and the third lens layer 640 for improving luminance in a direction toward each of the left lower end and the right upper end are disposed to overlap each other, the light control film 600 according to embodiments of the present disclosure can improve an image based on a side viewing angle in a plurality of directions and can solve a problem where a bluish image is displayed with respect to the side viewing angle in the plurality of directions.

Figure 36A:
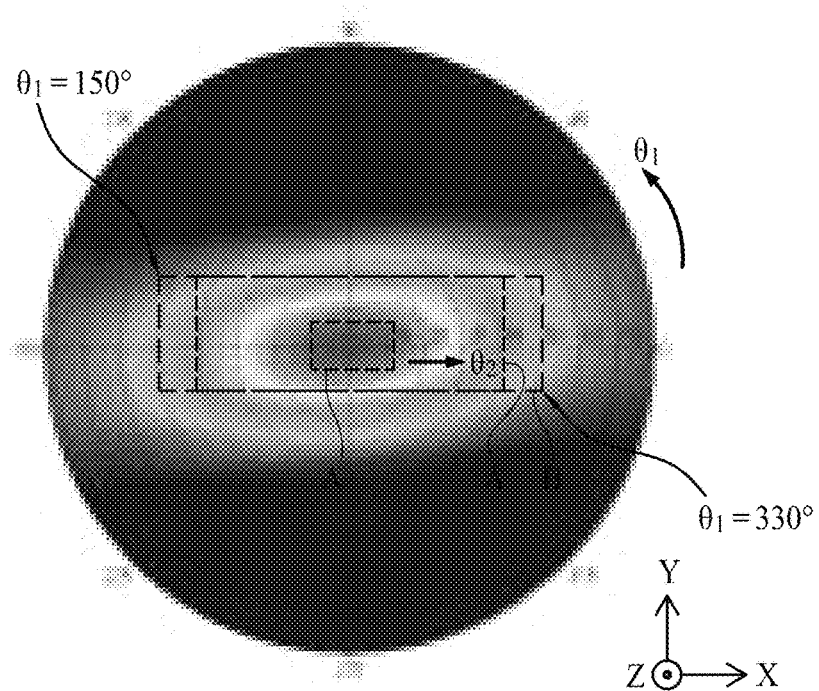
FIGS. 36A and 36B are diagrams illustrating an example where an image based on a side viewing angle in a plurality of directions is improved, in the display apparatus illustrated in FIG. 19 according to an embodiment of the present disclosure.
Figure 36B:
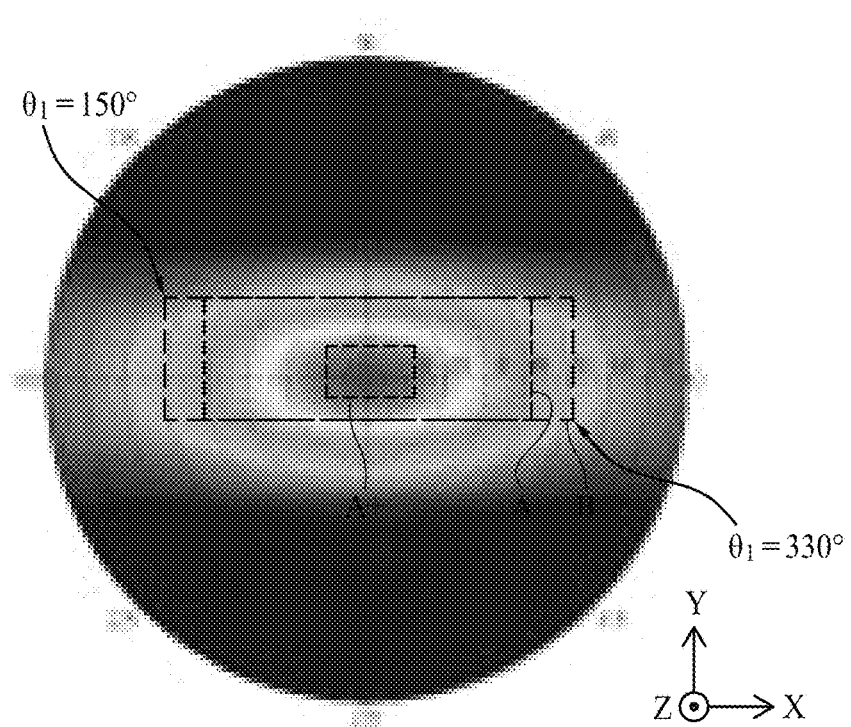

FIGS. 36A and 36B are diagrams illustrating an example where an image based on a side viewing angle in a plurality of directions is improved, in the display apparatus illustrated in FIG. 19. Here, FIG. 36A illustrates a viewing luminance of a display apparatus including a light control film which does not include a lens layer, and FIG. 36B illustrates a viewing luminance of a display apparatus including a light control film 600 according to embodiments of the present disclosure. Also, in FIGS. 36A and 36B, a first angle θ1 can correspond to an angle of a planar surface provided in an X direction and a Y direction, and a second angle θ2 can correspond to an angle of a planar surface provided in the X direction and a Z direction. Also, luminance can correspond to high luminance in a direction closer to a region A+, and luminance can correspond to low luminance in a direction closer to a region B.

Referring to FIG. 36A, when a display panel 200 is simply coupled to the light control film which does not include the lens layer, a moire phenomenon may occur, causing the degradation in image quality. Therefore, the display apparatus including the light control film which does not include the lens layer can be set a bias angle between the light control film and the display panel 200 to improve an image based on a side viewing angle. When the bias angle between the light control film and the display panel 200 is set, a problem where luminance is considerably reduced in at least one of four corners with respect to a side viewing field can occur.

For example, in a viewing luminance shown in FIG. 36A, it can be seen that luminance is considerably reduced in a left upper corner (θ1: 150 degrees) and a right lower corner (θ1: 330 degrees) of a region B because the bias angle between the light control film and the display panel 200 is set. Therefore, the display apparatus has a problem where a bluish image is displayed because the amount of emitted short-wavelength light such as blue light increases with respect to a side viewing angle of each of the left upper corner (θ1: 150 degrees) and the right lower corner (θ1: 330 degrees) of the region B. Also, the display apparatus has a problem where color shift occurs because a viewing angle difference between a left side and a right side occurs.

Referring to FIG. 36B, the display apparatus including the light control film 600 according to embodiments of the present disclosure can include a first lens layer 620, a second lens layer 630, and a viewing angle controller 650 including a plurality of slits 653. Accordingly, the display apparatus can prevent the occurrence of a moire phenomenon, even without a bias angle being set between the light control film 600 and the display panel 200.

As described above, since the light control film 600 according to embodiments of the present disclosure includes the first lens layer 620 for improving the horizontal-direction luminance and the second lens layer 630 for improving luminance in a direction toward each of a right lower end and a left upper end, the light control film 600 according to embodiments of the present disclosure can uniformly maintain luminance in the left upper corner (θ1: 150 degrees) and the right lower corner (θ1: 330 degrees) of the region B. Also, since the bias angle is not set between the light control film 600 and the display panel 200, the display apparatus according to embodiments of the present disclosure can have uniform luminance in four corners with respect to a side viewing field in the region B. Also, the display apparatus according to embodiments of the present disclosure can increase the amount of emitted long-wavelength light such as red light to prevent a bluish image from being displayed and can remove a viewing angle difference between a left side and a right side to prevent the occurrence of color shift.

Moreover, since the light control film 600 according to embodiments of the present disclosure includes the viewing angle controller 650, the light control film 600 can efficiently block side light in a vertical direction outside the region B, thereby reinforcing security and decreasing a phase-shown phenomenon. Also, the viewing angle controller 650 can decrease the phase-shown phenomenon to secure outdoor visibility.

Additionally, the display apparatus according to embodiments of the present disclosure can include the first to third lens layers 620 to 640 and the viewing angle controller 650, and thus, may not need an additional film for improving an image.

Figure 37A:
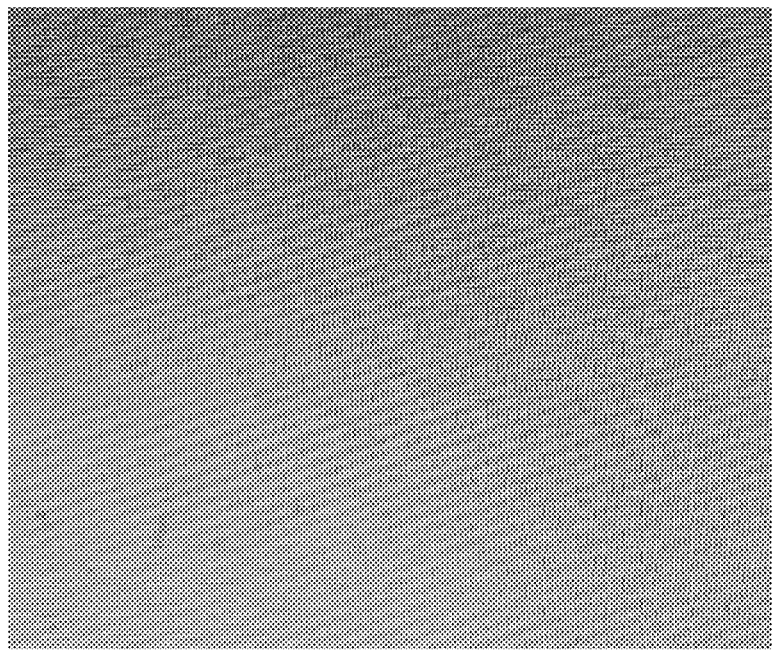
FIGS. 37A and 37B are diagrams illustrating an example where a moire phenomenon is reduced, in the display apparatus illustrated in FIG. 19 according to an embodiment of the present disclosure.
Figure 37B:
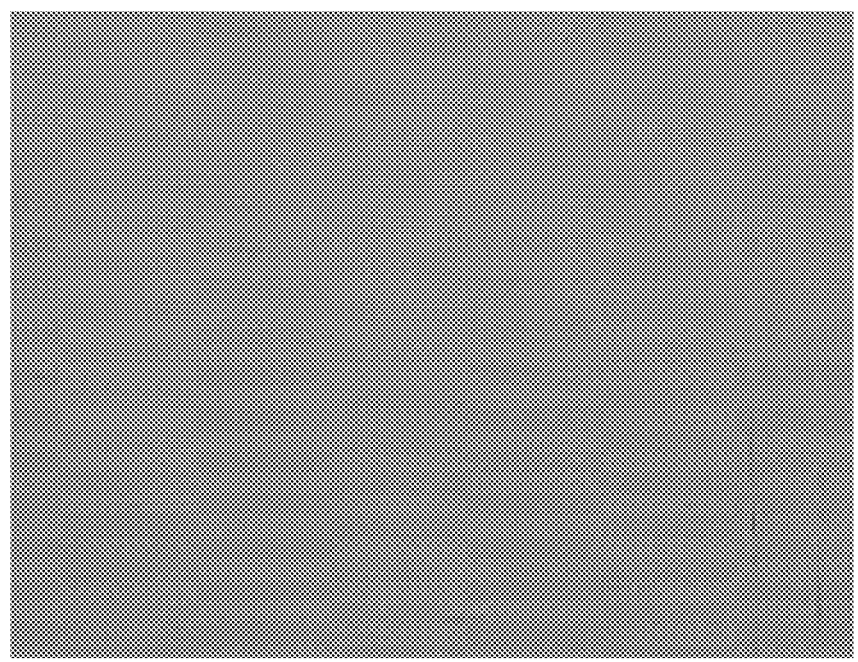

FIGS. 37A and 37B are diagrams illustrating an example where a moire phenomenon is reduced, in the display apparatus illustrated in FIG. 19. Here, FIGS. 37A and 37B show the occurrence or not of a moire phenomenon in samples 3 and 4 having the same condition. Also, a region of FIG. 37A can correspond to a display apparatus including a light control film which does not include a lens layer, and a region of FIG. 37B can correspond to a display apparatus including a light control film 600 according to embodiments of the present disclosure.

Therefore, it can be seen that a moire phenomenon appears in the region of FIG. 37A due to the display apparatus including the light control film which does not include the lens layer, and a moire phenomenon does not appear in the region of FIG. 37B due to the display apparatus including the light control film 600 according to embodiments of the present disclosure.

As described above, the light control film according to embodiments of the present disclosure can include a lens part for improving an image with respect to the side viewing angle in a first direction and a viewing angle controller for blocking side light in a second direction vertical to the first direction, thereby solving a problem where a bluish image is displayed with respect to the side viewing angle.

Moreover, the light control film can include a lens part including a plurality of optical patterns arranged regularly or irregularly and a viewing angle controller including a plurality of slits which extend in a first direction and are spaced apart from one another in a second direction vertical to the first direction, thereby improving an image with respect to the side viewing angle, reinforcing security, and decreasing a phase-shown phenomenon.

Moreover, the light control film can include a lens part for improving an image with respect to the side viewing angle in a plurality of directions and a viewing angle controller for blocking side light in a second direction vertical to a first direction, thereby improving an image with respect to the side viewing angle in the plurality of directions and decreasing a phase-shown phenomenon.

The above-described feature, structure, and effect of the present disclosure are included in at least one embodiment of the present disclosure, but are not limited to only one embodiment. Furthermore, the feature, structure, and effect described in at least one embodiment of the present disclosure can be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A light control film comprising:
a lens part including a plurality of optical patterns;
a viewing angle controller including a plurality of slits; and
a first based film disposed between the lens part and the viewing angle controller,
wherein the viewing angle controller has a light transmitting part and a light absorbing part which are alternately disposed, the light absorbing part being disposed in each of the plurality of slits, and
wherein the lens part includes:
a base layer configured to support the plurality of optical patterns, and
a cover layer covering the plurality of optical patterns and providing a flat surface on the plurality of optical patterns.

2. The light control film of claim 1, further comprising:
a second base film disposed on the viewing angle controller,
wherein the plurality of slits extend longitudinally in a first direction and are spaced apart from one another in a second direction.

3. The light control film of claim 2, wherein the lens part is configured to improve a side viewing angle of an image in the first direction, and
wherein the viewing angle controller is configured to block side light emitted in the second direction.

4. The light control film of claim 2, wherein a distance in the second direction between adjacent slits of the plurality of slits is less than or equal to approximately 50 μm.

5. The light control film of claim 1, wherein the plurality of optical patterns are disposed between the base layer and the cover layer.

6. The light control film of claim 1, wherein the lens part further includes a third base film, and
wherein the base layer is disposed between the third base film and the plurality of optical patterns.

7. The light control film of claim 6, wherein the plurality of optical patterns are disposed between the base layer and the cover layer, and the cover layer is attached to a surface of the first base film by an adhesive layer.

8. The light control film of claim 1, wherein the lens part further includes a third base film, and
wherein the third base film is disposed between the first base film and the cover layer.

9. The light control film of claim 1, wherein a refractive index of each of the plurality of optical patterns differs from a refractive index of the cover layer.

10. The light control film of claim 1, wherein lower surfaces of the plurality of optical patterns have different diameters, and
wherein a diameter of each of the lower surfaces of the plurality of optical patterns is less than or equal to approximately 20 μm.

11. The light control film of claim 1, wherein the plurality of optical patterns are arranged at different pitches, and
wherein a surface of each of the plurality of optical patterns includes a flat surface at a center region thereof and a curved surface at an edge region thereof.

12. The light control film of claim 1, further comprising:
a protective film attached on the viewing angle controller by an adhesive layer.

13. A display apparatus comprising:
a display panel;
a polarizing film disposed on the display panel;
a touch panel disposed on the polarizing film; and
the light control film of claim 1.

14. The display apparatus of claim 13, wherein the light control film is disposed between the display panel and the polarizing film, between the polarizing film and the touch panel, or on an upper surface of the touch panel.

15. A light control film comprising:
a lens part including:
a first lens layer disposed on the first base film, the first lens layer including a first optical pattern, and
a second lens layer overlapping with the first lens layer, the second lens layer including a second optical pattern differing from the first optical pattern;
a viewing angle controller including a plurality of slits; and
a first base film disposed between the lens part and the viewing angle controller,
wherein the first lens layer includes:
a first base layer configured to support the first optical pattern, and
a first cover layer covering the first optical pattern and providing a first flat surface on the first optical pattern, and
wherein the second lens layer includes:
a second base layer configured to support the second optical pattern, and
a second cover layer covering the second optical pattern and providing a second flat surface on the second optical pattern.

16. The light control film of claim 13, wherein the first optical pattern of the first lens layer is provided in plurality, and the plurality of first optical patterns are arranged along a first axis, and
wherein the second optical pattern of the second lens layer is provided in plurality, and the plurality of second optical patterns are arranged along a second axis differing from the first axis.

17. The light control film of claim 15, wherein the first optical pattern of the first lens layer is provided in plurality, and the plurality of first optical patterns are arranged along a vertical axis of the first base film, and wherein the second optical pattern of the second lens layer is provided in plurality, and the plurality of second optical patterns are arranged along a horizontal axis of the first base film.

18. The light control film of claim 17, wherein the first lens layer is configured to improve horizontal-direction luminance in a horizontal direction, the second lens layer is configured to improve vertical-direction luminance in a vertical direction, and wherein the viewing angle controller is configured to block side light emitted along the vertical direction.

19. The light control film of claim 15, wherein the second cover layer is disposed between the first base layer and the second optical pattern, and wherein the first cover layer is disposed between the first base film and the second lens layer.

20. The light control film of claim 15, wherein the first base layer is disposed between the first base film and the first optical pattern, and wherein the second cover layer is disposed between the first cover layer and the second optical pattern.

21. The light control film of claim 15, wherein the lens part further includes:

a third lens layer overlapping with the first and second lens layers, the third lens layer including a third optical pattern differing from the first and second optical patterns.

22. The light control film of claim 21, wherein the first optical pattern of the first lens layer is provided in plurality, and the plurality of first optical patterns are arranged along a first axis of the first base film, wherein the second optical pattern of the second lens layer is provided in plurality, and the plurality of second optical patterns are arranged along a third axis differing from the first axis, and wherein the third optical pattern of the third lens layer is provided in plurality, and the plurality of third optical patterns are arranged along a fourth axis differing from each of the first axis and the third axis.

23. The light control film of claim 22, wherein the first axis of the first optical pattern is parallel to a vertical axis of the first base film, and wherein the third axis of the second optical pattern and the fourth axis of the third optical pattern are symmetrical with each other with respect to the vertical axis of the first base film.

24. The light control film of claim 23, wherein the first lens layer is configured to improve horizontal-direction luminance, the second lens layer is configured to improve luminance in a direction toward each of a right lower end and a left upper end of the first base film, and the third lens layer is configured to improve luminance in a direction toward each of a left lower end and a right upper end of the first base film.

25. The light control film of claim 21, wherein the first optical pattern of the first lens layer is provided in plurality, and the plurality of first optical patterns are arranged along a second axis of the first base film, wherein the second optical pattern of the second lens layer is provided in plurality, and the plurality of second optical patterns are arranged along a fifth axis differing from the second axis, and wherein the third optical pattern of the third lens layer is provided in plurality, and the plurality of third optical patterns are arranged along a sixth axis differing from each of the second axis and the fifth axis.

26. The light control film of claim 25, wherein the second axis of the first optical pattern is parallel to a horizontal axis of the first base film, and wherein the fifth axis of the second optical pattern and the sixth axis of the third optical pattern are symmetrical with each other with respect to the horizontal axis of the first base film.

27. The light control film of claim 26, wherein the first lens layer is configured to improve horizontal-direction luminance, the second lens layer is configured to improve luminance in a direction toward each of a right lower end and a left upper end of the first base film, and the third lens layer is configured to improve luminance in a direction toward each of a left lower end and a right upper end of the first base film.

28. The light control film of claim 21, wherein the third lens layer further includes:

a third base layer configured to support the third optical pattern, and a third cover layer covering the third optical pattern and providing a third flat surface on the third optical pattern.

29. The light control film of claim 28, wherein the first base layer is disposed on the second cover layer to support the first optical pattern, the second base layer is disposed on the third cover layer to support the second optical pattern, and the first cover layer is disposed between the first base film and the second or third base layer.

30. The light control film of claim 28, wherein the first base layer is disposed on the first base film to support the first optical pattern, the first cover layer covering the first optical pattern contacts the second cover layer covering the second optical pattern, and the second base layer is disposed on the third cover layer to support the second optical pattern.

31. The light control film of claim 15, wherein the viewing angle controller further includes:

a light transmitting part and a light absorbing part which are alternately disposed, wherein the light absorbing part is disposed in each of the plurality of slits.

32. The light control film of claim 31, wherein the light absorbing part includes a light absorbing material filled into each of the plurality of slits.

* * * * *